Oct. 16, 1956 C. E. LOMAX 2,767,247

ARRANGEMENTS FOR SINGLE-MOTION NUMERICAL SWITCHES IN TELEPHONE SYSTEMS

Filed April 23, 1953 4 Sheets-Sheet 1

INVENTOR.
CLARENCE E. LOMAX
BY Wm. Walter Owen
ATTY.

Oct. 16, 1956 C. E. LOMAX 2,767,247

ARRANGEMENTS FOR SINGLE-MOTION NUMERICAL SWITCHES IN TELEPHONE SYSTEMS

Filed April 23, 1953 4 Sheets-Sheet 2

SELECTOR

INVENTOR.
CLARENCE E. LOMAX

BY McWatters Dwyer

ATTY.

Oct. 16, 1956 C. E. LOMAX 2,767,247

ARRANGEMENTS FOR SINGLE-MOTION NUMERICAL SWITCHES IN TELEPHONE SYSTEMS

Filed April 23, 1953 4 Sheets-Sheet 3

INVENTOR.
CLARENCE E. LOMAX
BY [signature]
ATTY.

Oct. 16, 1956 C. E. LOMAX 2,767,247

ARRANGEMENTS FOR SINGLE-MOTION NUMERICAL SWITCHES IN TELEPHONE SYSTEMS

Filed April 23, 1953 4 Sheets-Sheet 4

INVENTOR.
CLARENCE E. LOMAX

BY [signature]

ATTY.

United States Patent Office 2,767,247
Patented Oct. 16, 1956

2,767,247

ARRANGEMENTS FOR SINGLE-MOTION NUMERICAL SWITCHES IN TELEPHONE SYSTEMS

Clarence E. Lomax, Chicago, Ill., assignor to Automatic Electric Laboratories, Inc., Chicago, Ill., a corporation of Delaware Application April 23, 1953, Serial No. 350,688

24 Claims. (Cl. 179—18)

The invention relates to telephone systems and, more particularly, numerical switches, such as selectors and connectors, of the single-motion stepping type in such systems.

Generally speaking, single-motion switches are simpler in mechanical design than two-motion switches and require a lesser number of different parts for their manufacture and maintenance. They also have the advantage of providing greater flexibility as to the number and size of the groups of outlets that can be connected to their banks. On the other hand, if digit registers are not employed, numerical switches of the single motion type require the switch wipers to be advanced in response to a group-selecting series of impulses over outlets of unwanted groups to a position within, or immediately preceding, the wanted group in good time before the arrival of the next impulse series. In order to more safely meet this requirement it has previously been proposed to let the switch execute this group-skipping movement even while the group-selecting series of impulses is being received.

It is one of the objects of the present invention to provide in a numerical switch, such as a selector or connector, of the single-motion stepping type, improved means for coordinating the group-skipping movement of the switch with the received group-selecting impulses so that the switch, although rapidly advanced, is kept from overrunning the numerical pulses.

Another object of the invention resides in the provision of means for absorbing one or more impulses of the group-selecting impulse series by advancing the switch in response to these impulses, and at the same time utilizing the bank capacity of the switch to as full a degree as possible.

It is yet another object of the invention to provide, in connection with a party connector of the single-motion stepping type, novel and improved means for using an auxiliary switch both in the directive control of the connector switch and the selection of the desired type of ringing.

In accordance with one feature of the invention, there is provided a numerical connecting switch of the single-motion stepping type, such as a selector or connector, which has a control wiper and bank, the stepping magnet of the switch in series with its self-interrupter contact being connected to the control wiper, and has a control conductor which is energized through a break contact of the impulse relay of the switch and is multipled to contacts in the control bank each provided in a position at the beginning of an associated group of outlets. In the preferred embodiment of the invention described hereinafter for a selector as well as a connector these positions are the positions of the switch to which the first outlet of the particular group is connected. Thus, upon the release of the impulse relay, say in response to the sixth impulse of the group-selecting series of impulses, the switch immediately is stepped off the first position of the fifth group of outlets, this being the earliest moment at which the skipping of the fifth group can be initiated. In all positions of the various groups except the first and last positions a stepping potential is directly connected to the corresponding intermediate contacts of the control bank so that the switch automatically steps over these intermediate positions and if the switch is fast, is temporarily arrested in the last position of the group.

The contacts of the control bank in the last position of the various groups have another control conductor connected thereto which is energized through a make contact of the impulse relay. In this manner, the switch cannot be stepped on to the start position of the following, in the assumed example the sixth, group until the impulse relay has re-operated at the end of the impulse, the fifth in the present example. This prevents the switch from over-running the dial pulses as might otherwise happen due to the above-mentioned connections to the control bank being multipled between the various groups.

The switch has two sets of talking and test wipers and associated contact banks and the individual outlets of each group are connected in pairs to the two sets of banks with the result that only 5 switch positions are required for any group of 10 outlets. Single-motion stepping switches that can safely step over 5 positions in the time between successive impulses of a series are available, reference being made, e. g. to U. S. Patent 2,522,715 which issued to K. W. Graybill et al. on September 19, 1950. In accordance with a further feature of the invention and relating to trunk-hunting switches such as selectors, a single-motion switch whose group-skipping movement is controlled in the general manner described above is started on a double-trunk hunting operation, beginning with the afore-mentioned group start position, as soon as the changeover relay of the switch releases at the end of the group-selecting digit.

According to yet another feature of the invention and relating to a connector, an auxiliary switch likewise of the single-motion stepping type and associated with a connector of the general kind outlined above, is brought under the control of the connector impulse relay at the end of the group-selecting or tens digit and is then advanced in response to the impulses of the units digit. During this advance the auxiliary switch positions the connector switch and selects the wiper set of this switch in accordance with the units digit received. This same auxiliary switch is also employed to select, in accordance with another digit, one out of a number of sources of ringing current for the purposes of party-selection.

It will be evident from the above outline of some of the features of the invention that the first group of outlets connected to the switch banks should not be passed over by the switch wipers until the second impulse of the group-selecting series of impulses has been received. This requires absorption of the first impulse of the series. Moreover, if the number of outlet groups to be connected to the switch is less than 10, it may be desirable to absorb other impulses of the group-selecting series besides the first. In accordance with a further feature of the invention this is accomplished by providing the switch with multiple-ended wipers; letting the switch in its normal condition rest, with one end of these wipers, on a position near the end of the switch banks but separated therefrom by positions accommodating outlets of one or more of the final groups connected to those banks; and stepping these wiper ends over the last-mentioned positions in response to the impulses to be absorbed.

In the preferred embodiment of the invention illustrated in the accompanying drawings as applied to a selector switch, the last-mentioned wiper ends normally rest on the position of the switch accommodating the first pair of trunks of the last or "0" group of trunks and the switch is ineffectually stepped, one step for each of the initial impulses of the group-selecting series, over the afore-mentioned final positions of the switch and also over the position usually provided in switches of this type for accommodating the wiper brush springs. The remaining impulses of the group-selecting series then advance the switch from the first position of the switch bank, a plurality of steps per impulse, over the positions corresponding to unwanted groups to the start position of the wanted group in the manner outlined above. In this way, a maximum number of impulses are absorbed by the switch itself without any sacrifice in the number of usable trunks. The term "connecting switch" as used herein denotes a switch over whose switching elements the talking circuit extends.

The invention both as to its organization and method of operation together with other objects and features thereof, will best be understood by reference to the following specification taken in connection with the accompanying drawings. In these drawings.

In order to form a complete system, Figs. 1–4 should be placed side by side, proceeding from left to right in the order of the figure numbers.

GENERAL DESCRIPTION

Figure 1:
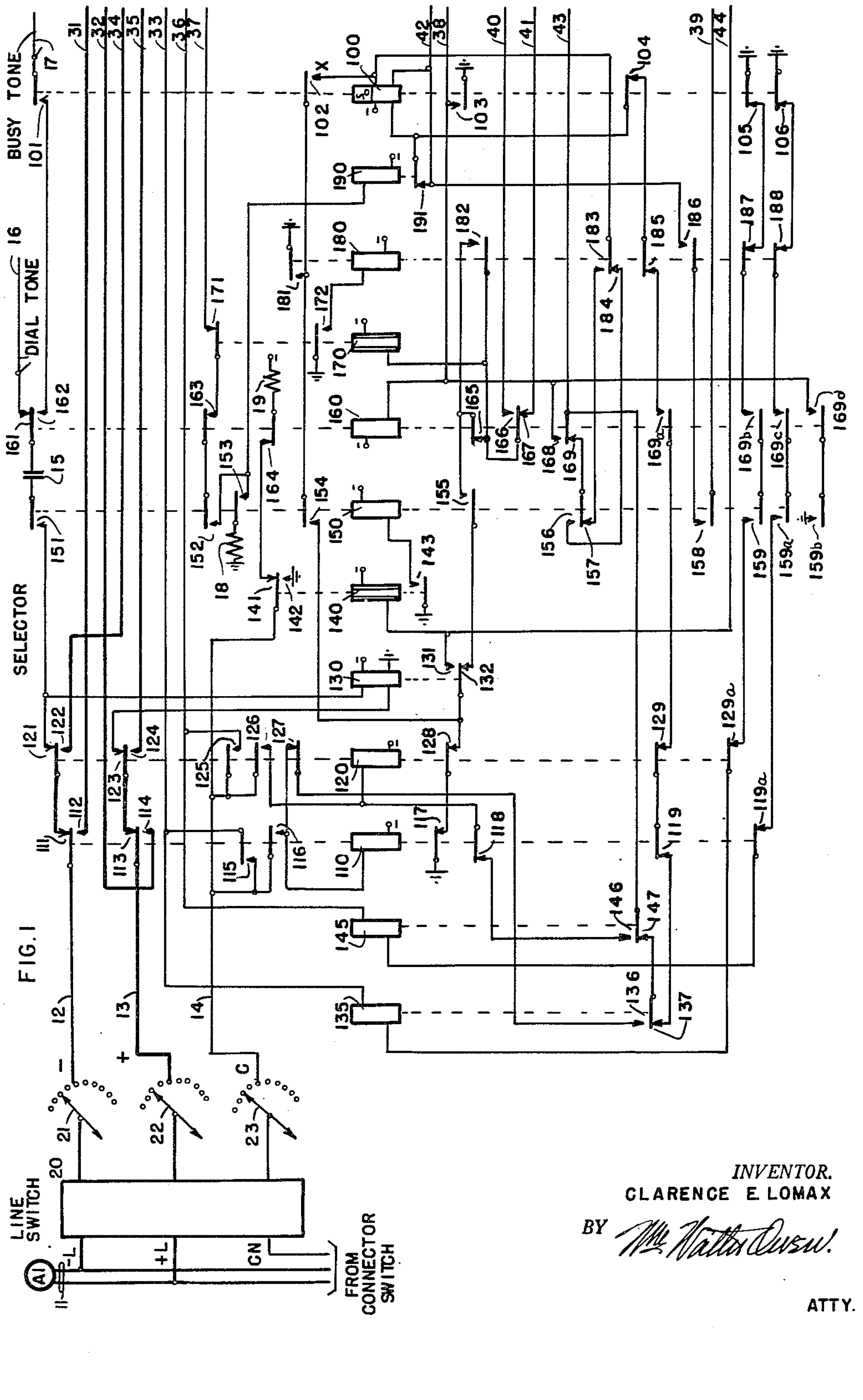
Fig. 1 shows part of the circuit diagram of a selector according to the invention; a substation and associated subscriber's line, and a rotary line switch connecting this line with the selector also are shown, schematically, in this figure.

A general description of the apparatus involved in the illustrated embodiments of the invention will first be given. Referring first to Fig. 1, there is shown a substation A1 and its associated subscriber's line 11. This subscriber's line has access, by way of a line switch 20 individually associated therewith, to a selector such as that shown in the main body of Fig. 1 and in Fig. 2, any may, in turn, be reached over the banks of connector switches, for example the connector shown in Figs. 3 and 4. The line switch 20 is assumed to be of the battery searching rotary stepping type, a line switch of this general type being shown in detail, for example, in British Patent 324,952. It should be understood, however, that non-numerical switches of a different type such as line finders could be used instead of line switches for connecting the subscribers' lines to a selector; that the selector could also be arranged for seizure by an absence-of-ground hunting switch; and that further switching stages, including, for example, another selector of the type shown in Figs. 1 and 2, could be interposed between the non-numerical switch and the selector shown and/or between the selector shown and the connector of Figs. 3 and 4.

Figure 2:
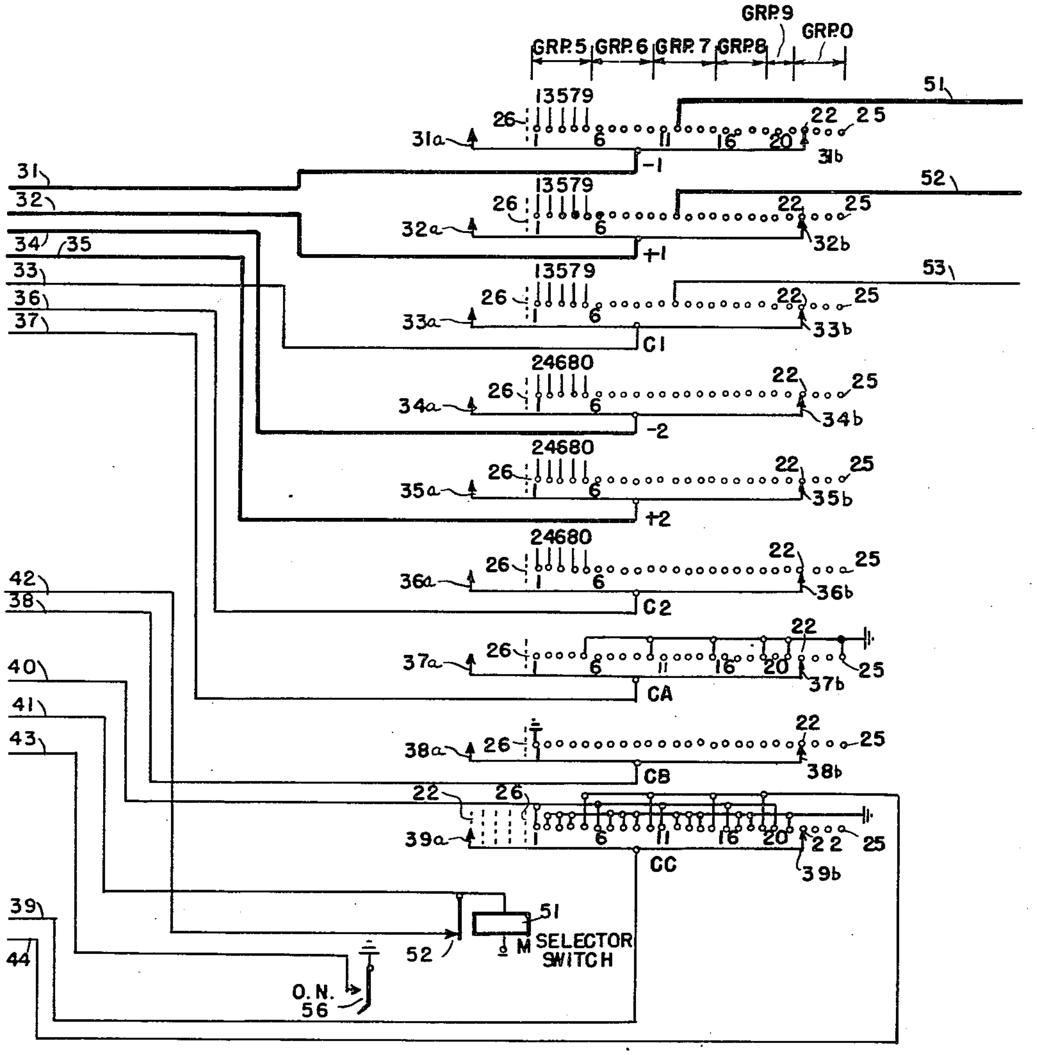
Fig. 2 illustrates the remaining part of the circuit diagram of the selector, showing in particular the manner in which the various blanks of the single-motion type selector switch are wired in accordance with the invention.

While the relays associated with the selector are shown in the main portion of Fig. 1, the selector switch itself is illustrated in Fig. 2. This selector switch is of the fast-stepping rotary type, preferably of the general design disclosed in the above-mentioned patent, No. 2,522,715, to K. W. Graybill et al., and has a stepping magnet 51 and associated interrupter contact 52, the switch being advanced upon de-energization of the magnet. The switch is equipped with two sets of double-ended talking and test wipers and associated contact banks, these wipers being designated —1, +1 and C1 for the first set and —2, +2 and C2 for the second set, and is further equipped with three double-ended control wipers CA, CB and CC and associated contact banks, these control wipers and banks being common to the aforementioned two sets of wipers and banks. The switch also has an off-normal contact 56.

The above nine contact banks are in the form of a corresponding number of coaxial semi-circular contact arcs, each of these arcs comprising 25 bank terminals so that the resulting trunk capacity of this switch is 2×25=50 trunks. In addition, the switch has a twenty-sixth position mounting the wiper brush or collector springs, designated 60 in U. S. Patent 2,522,715, which serves to establish the necessary electrical contact between the individual wipers and the external circuits with which they are respectively connected. In order to more clearly show the wiring of the various contact banks, the 25 terminals of each bank have been shown in Fig. 2 in a straight row; and in accordance with this type of presentation the two ends, such as **39*a* and 39*b*, of each wiper which in the actual switch are circumferentially displaced with respect to each other by 180 degrees as shown in the above Graybill patent, are illustrated in Fig. 2 as longitudinally spaced from each other by an amount corresponding to 26 steps of the switch. In both cases the result, of course, is the same, i. e. as one wiper end moves out of engagement with the associated contact bank, the other wiper end moves into the position, numbered 26**, immediately preceding the beginning of this bank so that another step moves this last-mentioned wiper end into engagement with the first contact in this bank.

However, it will be noted from Fig. 2, that the normal or home position of the switch, instead of being position 26 as would correspond to usual practice, in the instant case is position 22; this is so because the cam means co-acting with off-normal contact 56 are angularly set relatively to the switch shaft so as to actuate this contact in switch position 22, whereby this contact is open in position 22 and closed in all other positions including position 26, of the switch. Since, as shown in Patent 2,522,715, the afore-mentioned cam means are in the form of two pins, designated 65 in the patent and fixedly mounted with respect to the switch shaft at diametrically opposite points thereof this contact is opened in switch position 22 regardless of whether the *a* or *b* wiper ends are in this position. It will be understood therefore, that when the switch has been advanced to its normal position at the end of a given call, for example to trunk group 7, the positions of the *a* and *b* wiper ends, Fig. 2, are reversed and then again reversed at the end of the next call and so on.

As also shown in Fig. 2, a total of six groups of trunks numbered 5, 6, 7, 8, 9 and 0, are connected to the talking and test banks of the switch. As shown in detail for the first of these groups, 5, the individual trunks of each group are connected to the two bank sets in pairs so that trunks 1 and 2 appear in the first position of the group, trunks 3 and 4 in the second position and so on, all odd-numbered trunks thus being accommodated by the first set of banks and all even numbered trunks by the second set of banks. Each of groups 5, 6 and 7 has ten trunks and accordingly occupies five switch positions; each of groups 8 and 0 has eight trunks and, therefore, takes up 4 switch positions; and group 9 is assumed to comprise only four trunks so that this group requires only two switch positions. As mentioned above, the switch wipers normally rest with one of their ends, viz. the right hand end in Fig. 2, in position 22, the first pair of trunks of the last group 0 being connected to this position.

The group-skipping movement of the selector switch is primarily controlled by control wiper CC and its associated bank. The connections to this control bank include control conductor 40 which is multipled to the contacts in this bank corresponding to the first position of each group except group 0, and control conductor 44 which is multipled to the control bank contacts corresponding to the last position of each group except groups 9 and 0. The control bank contacts in all intermediate positions of groups 5—8 and also in the last position of group 9 are directly wired to ground as shown.

As will be seen from Fig. 2, ground is connected to the contacts of control bank CA provided in the last position of each of the six groups, bank CA thus being employed for all-trunks-busy control. In control bank CB only the first contact is used; relay 160, Fig. 1, which is controlled by the ground connected to this one contact serves, among others, to transfer the selector switch from one-step-per-pulse to multi-step-per-pulse operation during the receipt of the group-selecting digit. It will be understood that control wiper CB and its associated bank could readily be replaced by a second set of cam- or pin-operated off-normal springs which would be adjusted to be closed in position 1 and open in all other positions, including position 26, of the switch.

Figure 3:
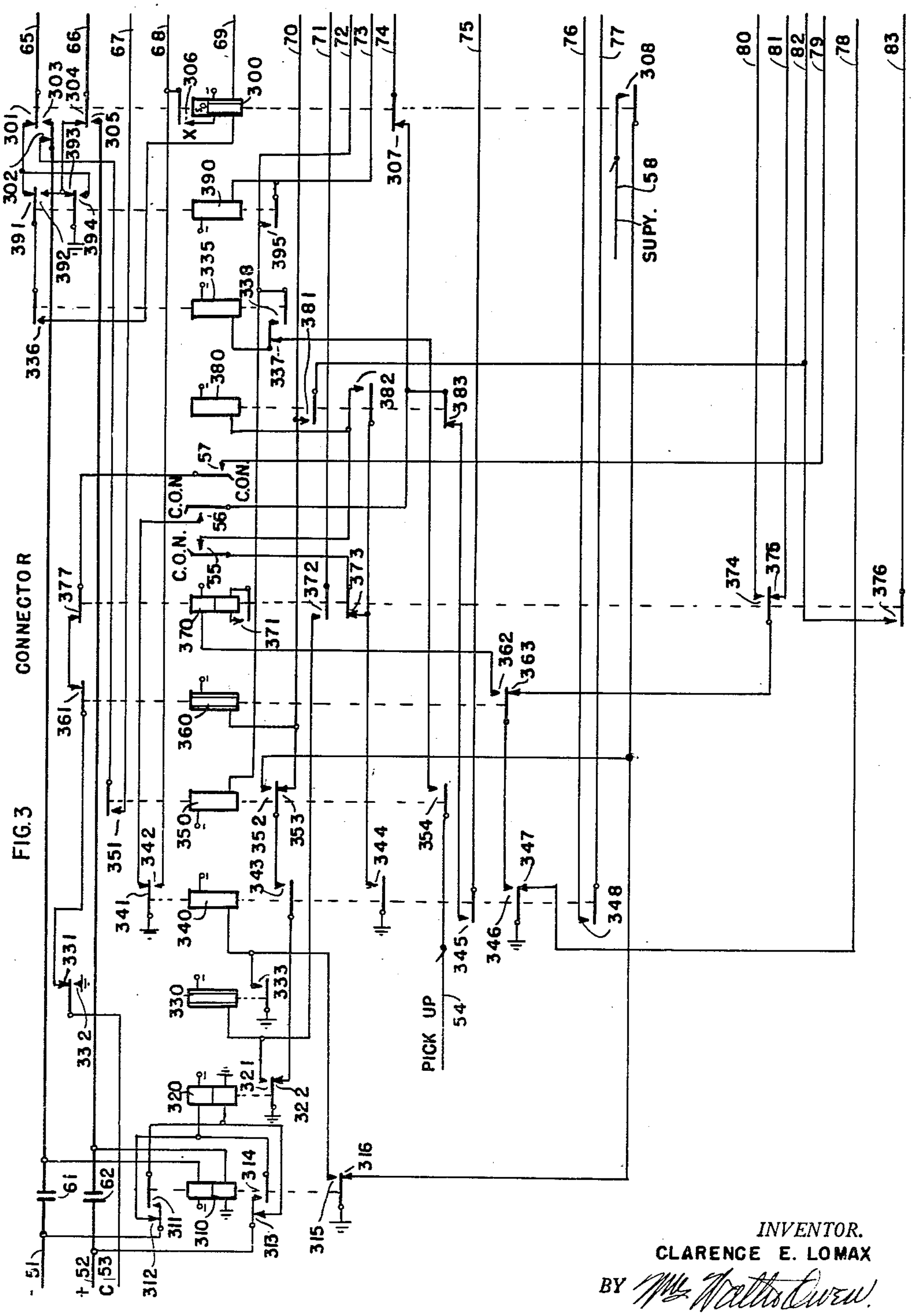
Fig. 3 shows part of the circuit diagram of a connector according to the invention.
Figure 4:
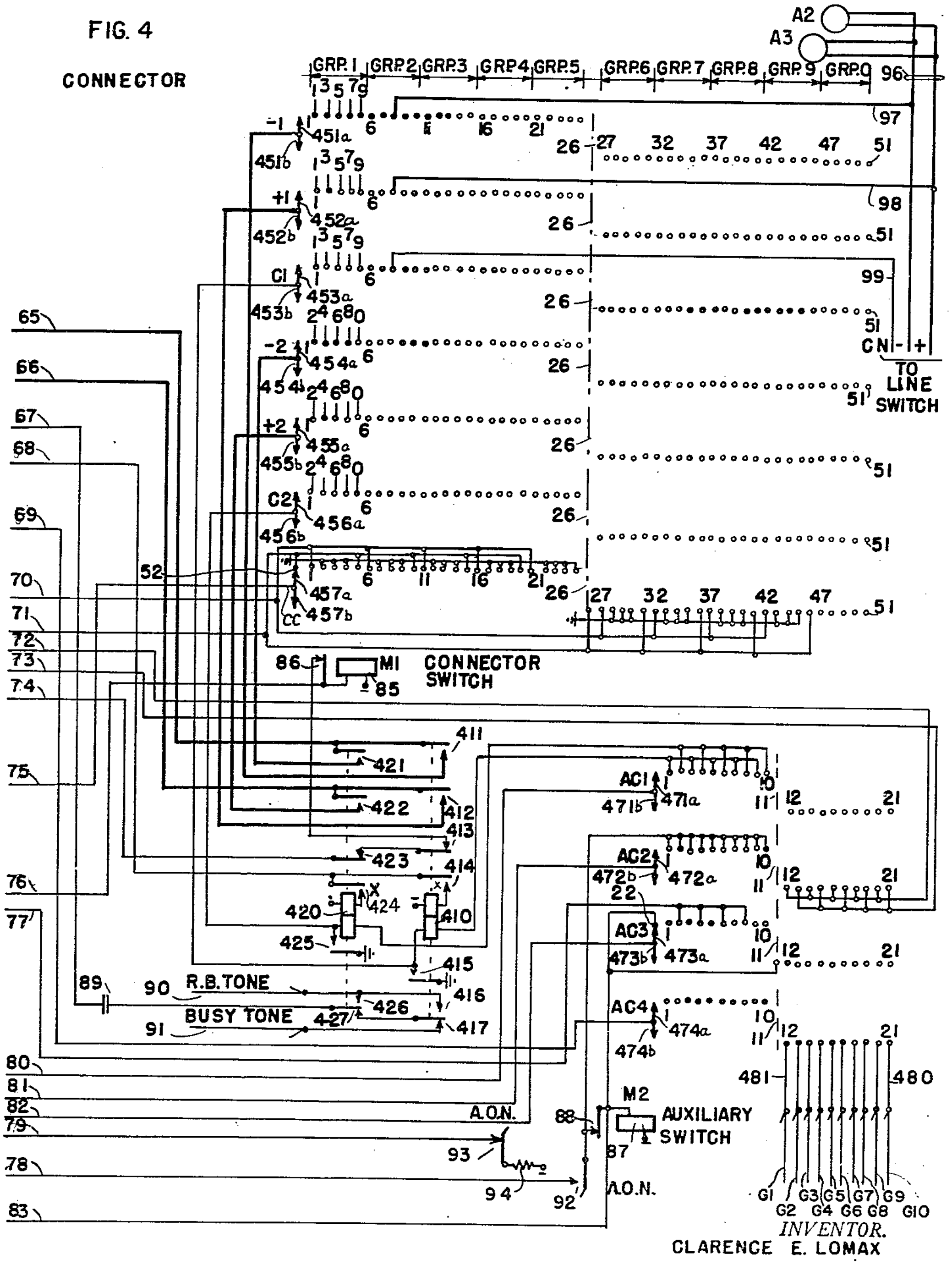
Fig. 4 shows the remaining part of the circuit diagram of the connector and illustrates particularly the manner in which the various banks of the connector switch as well as its auxiliary switch are wired, both these switches also being of the single-motion type. Also shown in this figure is a party line accessible to this connector, and two substations connected to this party line.

Referring now to Figs. 3 and 4, there is shown a party line connector according to the invention. Most of the relay equipment of this connector is illustrated in Fig. 3, while Fig. 4 shows the connector switch itself, and an auxiliary switch and two switching relays, 410 and 420, associated with the connector. Like the selector switch of Fig. 2, the connector switch shown in Fig. 4 is assumed to be of the general design disclosed in U. S. Patent 2,522,715. The switch has a stepping magnet 85 with an associated interrupter contact 86, the switch being advanced upon de-energization of the magnet, and has a set of off-normal contacts 55—57 which are shown in Fig. 3. The connector switch also has two sets of pairs of talking and test wipers, collectively designated —1, +1, C1 for the first set and —2, +2, C2 for the second set, together with the associated two sets of pairs of semi-circular 25-point talking and test banks, and, in addition a pair of control wipers CC and associated banks which is common to the afore-mentioned two sets.

Contrary to the selector switch, Fig. 2, the wipers of the connector switch are single-ended but are connected together in pairs, the two wipers such as 451*a* and 451*b*, of each pair respectively cooperating with the two banks of the associated bank pair but being circumferentially displaced by 180° with respect to each other; thus, as one wiper of a pair moves off the end of its bank or level the other wiper of the pair moves into the position immediately preceding the first contact of its bank or level, the last-mentioned two positions being numbered 26 and 52 respectively. This relation between the wipers and their banks has been brought out in the straight-line presentation according to Fig. 4 by showing the two wipers of each pair vertically in alignment but showing the two levels of bank contacts associated therewith horizontally displaced by 26 steps with respect to each other. The wiper collector springs are mounted in position 52, i. e. in the position in which the first wiper, such as 451*a*, of each pair stands at the beginning of its associated bank, and the above-mentioned off-normal contacts 55—57 are arranged to be actuated, that is contacts 55 and 56 to be opened and contact 57 to be closed, in position 52, thereby marking this position as the normal position of the switch. In the case of this switch only one pin is provided for actuating the off-normal contacts.

As shown in Fig. 4, the connector switch accommodates ten groups of ten subscribers' lines each or a total of 100 lines, these lines being either individual or party lines. While only two parties, A2 and A3, are shown connected to subscriber's line 96, Fig. 4, it will be understood from the detailed description given hereinafter that as many as ten parties may be connected to this or any other line accessible to the connector. As indicated in Fig. 4 for tens group 1, the individual lines of each tens group are connected to the two sets of banks in pairs, the outlet assignment of the connector being similar in this respect to that of the selector, Fig. 2. The connections to the switch control bank CC, Fig. 4, likewise follow generally the same pattern as the wiring of control bank CC of the selector switch, Fig. 2. It may be mentioned, however, that while no bank terminals are provided in the 26th and 52nd positions of the talking and test banks of the connector switch, provision is made for a bank terminal in the corresponding position of each of the two control banks CC, these two control contacts being multipled to the second of the two control conductors, 70 and 71, controlling the group-skipping movement of the connector switch.

The auxiliary switch shown in Fig. 4 also may be of the same or similar design as that disclosed in the above-mentioned Graybill et al. patent except that this switch requires only 10-point contact banks. As will be clear from Fig. 4, this auxiliary switch, in addition to its stepping magnet 87, interrupter contact 88 and off-normal contacts 92, 93 has four pairs, AC1—AC4, of single-ended wipers and associated contact banks, the two wipers, such as 471*a* and 471*b*, of each pair being angularly displaced with respect to each other by 180° so that these two wipers engage their respective contact banks in succession. A complete revolution of the switch is assumed to take 22 steps but in positions 11 and 22 the two AC3 banks only are equipped with bank terminals. The cam or pin, not shown, co-acting with off-normal contacts 92, 93 is set so as to actuate these contacts, that is open contact 92 and close contact 93, in the position, numbered 22, in which the upper wiper, such as 471*a*, of each pair rests immediately in back of the first contact of its associated bank, this position being the one mounting the wiper brush springs of the switch. The switch wipers are advanced upon release of the stepping magnet.

The connections to contacts 1—10 of the AC3 and AC1 banks of the auxiliary switch respectively serve to advance the connector switch in response to and concurrently with the units digit from the first position of the previously selected units group of lines to the desired position within this group, and to connect up odd switching relay 410 or even switching relay 420 depending on whether the wanted line is connected to the first or second set of connector banks. At the end of the units digit the auxiliary switch is then automatically advanced to its eleventh position, namely by virtue of the circuit connections to the upper AC2 bank. Responsive to the receipt of the station digit the auxiliary switch is subsequently advanced to one of its positions 12—21 for purposes of party-selection, different sources G1—G10 of ringing current being connected to the AC4 bank in these positions, and the corresponding contacts of the AC2 bank being wired to cause or not cause the operation of side-of-line switching relay 390, Fig. 3, depending on whether an even or odd station digit is dialled.

DETAILED DESCRIPTION

A detailed description of the operation of the system illustrated in the drawings will now be given, and for the purposes of this description it will first be assumed that the subscriber at substation A1, Fig. 1, initiates a call to subscriber A2, Fig. 4, whose directory number is 7256.

When the subscriber at substation A1 lifts his handset from the cradle a loop circuit is closed across his line 11 in the usual manner, whereby line switch 20 which is associated with this subscriber's line is started in search for an idle selector and a guarding ground is placed on control conductor CN in a well known manner to guard the line against seizure from a connector. As mentioned above, line switch 20 is of the battery searching type, a switch of this general kind being described, for example, in British Patent No. 324,952. Assuming that the selector shown in Fig. 1 and 2 is the first idle selector found by line switch 20, the test circuit of this line switch is completed by way of the test wiper 23, of this switch, conductor 14, contacts 141 and 164, resistance 19, to battery. The line is now switched through in the line switch in the manner well known in the art so that the following loop circuit is closed to line relay 130 in the selector: substation A1, subscriber's line 11, switching contacts, not shown, and talking wipers 21, 22 and associated banks of line switch 20, line conductors 12, 13, contacts 111, 113, contacts 121, 123, upper and lower winding of line relay 130, to battery and ground, respectively.

*Selector operation*

Line relay 130 of the selector in operating closes a circuit for hold relay 140 by way of contacts 117, 128 and 131. Hold relay 140 upon operating at contacts 141, 142 transfers incoming control conductor 14 from resistance battery to ground to hold the switching relay, not shown, of the line switch operated in the well known manner and keep the selector guarded against seizure by other line switches; at contacts 143 relay 140 closes an obvious circuit for its slave relay 150. When relay 150 operates it connects dial tone to the negative line conductor 12 by way of dial tone conductor 16, contact 161, condenser 15 and contacts 151, 121 and 111 so that dial tone is transmitted to the calling subscriber's receiver; at contact 154 relay 150 prepares a holding circuit for relay 100 and at contact 155 an operating circuit for relay 170; and at contact 153 relay 150 closes a pre-energizing circuit for relay 190 extending from ground through limiting resistance 18, contact 153, winding of relay 190, to battery. The energization of the winding of relay 190 in series with resistance 18 is not strong enough to operate this relay.

Upon receiving the dial tone as described, the calling subscriber at substation A1 actuates his calling device in accordance with the first digit, 7, of the called subscriber's number which digit serves to select the corresponding one of the trunk group connected to the selector switch, Fig. 2, as described hereinafter. Upon each release of line relay 130 in response to the impulses of this impulse series the circuit of hold relay 140 is opened at contact 131 but relay 140, due to its slow-release characteristic, remains operated throughout the impulse series. On the first and each following release of relay 130 the following circuit is closed, at contact 132, for changeover relay 170: ground, contacts 117, 128, 132, 155, 165, winding of relay 170, battery. Relay 170 which also is a slow-releasing relay remains operated throughout the digit in spite of the momentary re-operations of relay 130 during the series of impulses. At its contact 172, relay 170 causes the operation of its slave relay 180 over an obvious circuit. Relay 180 in operating at contact 182 maintains the circuit of relay 170 independent of contact 165 of relay 160; at contact 185 opens a self-interrupting circuit traced hereinbelow for stepping magnet 51, Fig. 2, of the selector switch; at 186 completes a connection between conductors 39 and 42, thereby connecting the break spring of self-interrupter contact 52, Fig. 2, to control wiper CC of the selector switch; and at contacts 187, 188 disconnects ground from the left-hand terminals of the windings of test relays 135, 145 to prevent these relays from operating during the receipt of the group-selecting series of impulses.

Upon the afore-mentioned closure of contact 182 incident to the first release of relay 180 the following circuit for stepping magnet 51, Fig. 2, of the selector switch is closed in multiple to the winding of changeover relay 170: ground, contacts 117, 128, 132, 155, 165, 167, conductor 41, winding of magnet 51, battery. Magnet 51 upon operating actuates its interrupter contact 52, but since the last-traced circuit does not include this contact, the opening of contact 52 is without effect at this time.

Upon the re-operation of line relay 150 at the end of the first impulse the above-traced circuits for changeover relay 170 and magnet 51 are opened at contact 132, so that magnet 51 releases, thereby advancing the wipers of the selector switch one step. In this manner wiper ends **31*b* to 39*b* of the selector switch are moved from position 22 accommodating the first pair of trunks of group 0 to position 23** which accommodates the second pair of trunks of this group.

Wiper ends **31*b* to 39*b* of the selector switch are advanced in the same manner, that is one step per impulse, from position 23 to 24 and from position 24 to 25. The next following or fourth impulse of the series moves the right-hand wiper ends 31*b* to 39*b* off the last contact, 25, of their respective banks to which the last pair of trunks of group 0 is connected, and thereby moves the left-hand wiper ends 31*a* to 39*a* into the vacant position, 26, in which these wiper ends rest immediately in back of the first contact of their associated contact banks which accommodates the first pair of banks of group 5; and the fifth impulse of the series moves these wiper ends into actual engagement with the last-mentioned contact. It will be appreciated, therefore, that the first four impulses of the group selecting series of impulses are absorbed by moving the selector switch, one step per impulse ineffectively over the four positions used for accommodating trunk group 0, and that the fifth impulse of this series is absorbed by so moving the selector switch over vacant or wiper-brush-spring position 26**.

When the wipers of the selector switch move into position 1 at the end of the fifth impulse the following circuit is closed for relay 160: ground connected to the first contact in the CB bank, wiper **38*a*, conductor 38, winding of relay 160, Fig. 1, battery. Relay 160 in operating at contact 161 disconnects dial tone from the calling line; at contact 162 closes a point in the busy tone circuit; at contact 163 connects the winding of relay 190 to the CA wiper by way of conductor 37 and contacts 171, 163 and 152; at contact 164 opens another point in the battery connection to incoming test conductor 14; at contact 165 opens the original operating circuit for relay 170; at contacts 167, 166 transfers the impulse circuit from conductor 41 which was used in the above one-step-per-impulse advancement of the switch to conductor 40 with the aid of which the switch is advanced a plurality of steps per impulse as described hereafter; at contact 168 closes a locking circuit for relay 160 extending by way of conductor 43 and off-normal contact 56 to ground and at contact 169*d* closes a multiple locking circuit extending through contact 159*b* to ground; at contact 169*a* closes a point in a self-interrupting circuit for magnet 51 which is later used for trunk hunting and homing purposes; and at contacts 169*b* and 169*c* closes a point each in the circuits of test relays 135 and 145. It will be observed that the circuits prepared by the last-mentioned three contacts, 169*a*, 169*b*, and 169*c*, are held open at this time at contacts of relay 180**.

When line relay 130 releases at the beginning of the sixth impulse the following circuit including interrupter contact 52 is closed for stepping magnet 51 by way of control conductor 40: ground, contacts 117, 128, 132, 155, 182, 166, control conductor 40, contact 1 in the control bank CC of the selector switch, wiper end **39*a* of the CC wiper in position 1, conductor 39, contacts 158 and 186, conductor 42, interrupter contact 52, winding of magnet 51, battery. Magnet 51 immediately attracts its armature, thereby interrupting the last-traced circuit at its contact 52. As a result stepping magnet 51 is de-energized and the wipers of the selector switch are moved into position 2. In this position a new self-interrupting circuit for magnet 51 is closed which circuit may be traced as follows: ground strapped to contact 2 in the CC bank of the selector switch, end 39*a* of the CC wiper, conductor 39, contacts 158 and 186, conductor 42, interrupter contact 52, magnet 51, battery. This magnet, therefore, operates again, thereby opening its interrupter contact 52 and the ensuing release of magnet 51 advances the wipers of the selector switch into posiion 3 and causes interrupter contact 52 to re-close. As contacts 3 and 4 of control bank CC are likewise strapped to direct ground the switch is rapidly moved in this manner into position 5**.

It will be understood from the preceding part of the description that the circuit extending through break contact 132 of line or impulse relay 130 is merely used to step the switch off position 1 and that the switch thereafter is automatically advanced all the way to position 5 independently of the condition of the impulse relay. This makes it possible for the switch to reach position 5 safely even though relay 130 re-operates prior to this time, for instance due to a fast dial adjustment or a small break-make ratio of the received dial pulses. On the other hand the switch cannot be advanced beyond position 5 until the impulse relay re-operating at the end of the break period closes the following circuit extending over the second control conductor, 44, for magnet 51: ground, contacts 117, 128, make contact 131 of impulse relay 130, control conductor 44, control wiper end 39*a* in position 5, conductor 39, contacts 158 and 186, conductor 42, interrupter contact 52, magnet 51, battery. This insures that control wiper end 39*a* cannot reach the second appearance, in position 6, of first control conductor 40 while break contact 132 of the impulse relay is still closed incident to the first impulse. In this manner the switch is kept from over-running the dial pulses in spite of the fact that control conductor 40 is multipled to the first control contact of a plurality of groups.

In response to the sixth impulse of the group selecting series the switch has thus skipped the five switch positions corresponding to the ten trunks of group 5 and is now in the position, 6, which corresponds to the first pair of trunks of group 6.

Upon release of relay 130 in response to the following, i. e. seventh, impulse which as assumed is the last of the series, the first control conductor 40, is again grounded by way of break contact 132 of impulse relay 130 so that magnet 51 is again energized in a circuit extending further through control wiper end 39*a* in position 6, conductor 39, contacts 158 and 186, conductor 42, interrupter contact 52, winding of magnet 51, battery. The selector switch is accordingly stepped off position 6 in the same manner as explained above for position 1, and as direct ground is strapped to contacts 7, 8 and 9 of control bank CC the switch is at once further advanced, by a self-interrupting circuit similar to that described above, until it reaches position 10. As soon as line relay 130 re-operates at the end of the seventh impulse the second control conductor, 44, is again grounded at make contact 131 of this relay and as this control conductor is multipled, among others, to the tenth contact in control bank CC the switch is further advanced from position 10 to position 11. In this manner the switch has been advanced, in response to the seventh or last impulse of the group-selecting series over all the five positions corresponding to trunk group 6, with the result that the switch wipers now rest in position 11 to which the first pair of trunks of the desired trunk group 7 is connected.

It may be mentioned at this point that the rotary stepping switches of the type used in the embodiments of the invention described herein for a selector and connector switch rotate at a rate of roughly 75 steps per second when operated in a self-interrupting circuit. This means that these switches take one step in approximately 13.3 milliseconds. Assuming a dial of the nominal speed of ten impulses per second, line relay 130 receives an impulse every 100 milliseconds. This means that the switch is capable of taking approximately 100:13.3=7.5 steps between any two impulses of the group selecting series. Inasmuch as the switches in the embodiments described herein are required to skip only five positions, that is take only five steps, in the time between two impulses, the switches are able to keep up with the dial pulses without difficulty.

At the end of the group selecting series of impulses changeover relay 170 releases as its circuit is permanently opened at break contact 132 of the impulse relay. Relay 170 in restoring at contact 172 causes the release of its slave relay 180. When relay 180 restores it opens at its contact 182 another point in the circuit of relay 170 to prevent the re-operation of this relay; at contact 186 relay 180 disconnects interrupter contact 52 of magnet 51 from the CC wiper of the selector switch; at contacts 187 and 188 connects the left-hand terminal of the windings of test relays 135, 145 to ground; and at contact 185 completes the following new self-interrupting circuit for stepping magnet 51: ground, off-normal contact 56, conductor 43, contact 147 of test relay 145 and contact 137 of test relay 135, contacts 119, 129, 169*a*, 185, 104 and 191, conductor 42, interrupter contact 52, magnet 51, battery.

As mentioned above, the selector shown in Figs. 1 and 2 is of the battery searching type. Therefore should the connector accessible over either the first or the second trunk of trunk group 7 be idle, one of the following two test circuits would be completed for test relay 135 or 145, as the case may be: ground, contacts 105, 187, 169*b*, 159, 129*a*, winding of test relay 135 which is associated with the first or upper set of selector wipers, conductor 33, test wiper C1 in position 11, contact 11 in the C1 bank of the selector switch and from there over a resistance in the idle connector to battery; or: ground, contacts 106, 188, 169*c*, 159*a*, 119*a*, winding of test relay 145 which is associated with the second or lower set of selector wipers, conductor 36, wiper C2 of the selector switch in position 11, contact 11 in the C2 bank of the switch and from there through a resistance in the idle connector to battery. If both of the afore-mentioned connectors are idle either of the two test relays may operate and the test relay that operates first, say relay 135, opens the last-traced self-interrupting circuit of stepping magnet 51 at its break contact, in the assumed case 137, and closes the circuit of the associated switching relay, in the assumed case 110, at its make contact, that is contact 136, this circuit of switching relay 110 extending from ground through conductor 43, contacts 147, 136, 127, and the winding of relay 110 to battery. If only one trunk of the pair is idle, only the test relay associated with this particular trunk can operate and, in turn, cause the operation of its associated switching relay. In the instant case, it will be assumed that both trunks connected to the first position 11, of group 7 are busy. Consequently, neither test relay can operate but stepping magnet 51 is operated in the following self-interrupting circuit: ground, off-normal contact 56, conductor 43, contacts 147, 137, 119, 129, 169*a*, 185, 104, 191, conductor 42, interrupter contact 52, magnet 51, battery. The switch is accordingly advanced into position 12 to which the second pair of trunks of group 7 is connected. Assuming that the second of these two trunks is busy but that the first comprising conductors 51, 52, 53 is idle, battery is connected in the connector, Fig. 3, to test conductor 53 by way of resistance 94, off-normal contact 93, conductor 79, off-normal contact 57 and contacts 377, 361 and 331 and accordingly test relay 135 operates from this resistance battery, in turn operating switching relay 110 as described above.

Switching relay 110 is operating at its contact 119*a* opens the circuit for the other test relay, 145, to prevent this relay from operating; at its contact 118 opens a circuit of the other switching relay, 120, to keep the last-mentioned relay from operating; at contact 119, opens another point in the last-traced self-interrupting circuit for magnet 51; at contact 117 disconnects ground from the impulse circuit; at contact 116, locks to ground on conductor 14; at contact 115 causes test relay 135 to be shortcircuited by ground at contact 142, and at the same time connects the winding of relay 110, in series with contact 116, to conductor 33 and the C1 wiper of the selector to prepare the holding of relay 110 independently of contact 142 from ground returned over this wiper from the connector; and at contacts 111, 113 and 112, 114 transfers the incoming line conductors 12, 13 from line relay 130 to the —1 and +1 wipers of the selector switch by way of conductors 31 and 32, respectively. Test relay 135 in releasing in response to the above-mentioned short circuit of its winding opens the operating circuit of relay 110.

Upon closure of contacts 112, 114 the calling loop is extended over conductors 31, 32, wipers —1 and +1 of the selector switch in position 12, conductors 51, 52 of the connector, contacts 312, 313 and the upper and lower winding of line relay 320 of the connector, Fig. 3, to battery and ground respectively. Relay 320 in operating at its contact 321 causes the operation of relay 330. This last-mentioned relay at its contact 323 energizes the winding of relay 340; and at contacts 331, 332, transfers the incoming test conductor 53 of the connector from resistance battery to ground. This last-mentioned ground causes the switching relay 110 of the selector, Fig. 1, and also the switching relay, not shown, of line switch 20 to be held independently of contact 142 of relay 140, Fig. 1. The opening of contacts 111 and 113 brings about the release of line relay 130 of the selector which at 131 opens the circuit of relay 140. This relay in releasing after a short time interval, at its contact 143 de-energizes the winding of its slave relay 150 and at contact 142 disconnects multiple ground from test conductor 14. Relay 150 in restoring upon the de-energization of its winding at contact 153 opens the pre-energizing circuit of relay 190 and at contacts 159 and 159*a* opens a further point in the operating circuits of test relays 135 and 141.

Before proceeding with the description of the further extension of the connection by way of the connector, Figs. 3 and 4, the operation of the selector, Figs. 1 and 2, under various other conditions will first be considered. Assuming first that all trunks of trunk group 7 except the last are busy neither of test relays 135 or 145 can operate with the switch in position 12 and the selector switch is accordingly advanced into position 13 in the same manner as it was advanced from position 11 to position 12; and since neither of test relays 135 or 145 can operate in this position or the folowing position, 14, either, the switch wipers are advanced into position 15 which is the last position of trunk group 7. In this position the folowing circuit is completed for relay 190: ground connected to contact 15 in the CA bank of the selector switch, CA wiper in position 15, conductor 37, contacts 171, 163 and 152, winding of relay 190, battery. Relay 190 in operating from this direct ground, at its contact 191 opens the short circuit across the lower winding of busy relay 100 so that this winding is energized in the last-traced self-interrupting circuit in series with magnet 51 of the selector switch. However, inasmuch as busy relay 100 is slow-to-operate the operation of test relay 145 from battery encountered by lower test wiper 32 on the last trunk of the group which as assumed is idle, opens the circuit of magnet 51 at contact 147 at about the same time as the lower winding of relay 100 is interposed into the circuit of magnet 51 by the operation of relay 190 so that neither busy relay 100 nor stepping magnet 51 are able to operate. If neither of the two trunks connected to the last position of group 7 is idle so that neither of the two test relays 135, 145 can operate, busy relay 100 operates after a short time delay in series with stepping magnet 51 but magnet 51 cannot operate under this condition in view of the relatively high resistance of the lower winding of relay 100. Busy relay 100 in operating at its preliminary or "X" contact 102 closes a locking circuit for itself extending from ground through contacts 117, 128, 154 and 102 and the upper winding of relay 100 to battery; at contact 101 connects busy tone to incoming negative talking conductor 12 by way of contact 162, condenser 15, and contacts 151, 121, 111 so that the calling subscriber receives an audible busy indication; at contact 103 closes a multiple ground to the winding of relay 160 without effect at this time; at contact 104 opens the above-traced circuit through the lower winding of relay 100 and magnet 51 in series; and at contacts 105 and 106 disconnects ground from the left hand terminal of the windings of test relays 135 and 145, respectively, to prevent subsequent operation of these relays.

Upon receiving the busy signal the calling subscriber replaces his handset, thereby causing the release of line relay 130 and, consequently, of relays 140 and 150. Relay 140 at its contact 142 disconnects ground from incoming test conductor 14, thereby causing the release of the switching relay of line switch 20 in a well known manner, but since resistance battery is still disconnected from conductor 14 at contact 164 the selector is not made available to other calls as yet. Relay 150 in releasing at its contacts 152 and 153 disconnects ground from the winding of relay 190, thereby permitting this relay to restore; at its contact 159*b* opens a multiple locking circuit of relay 160; and at contact 154 opens the locking circuit of busy relay 100 so that this relay releases after a slight delay. Upon the release of relay 100 the following homing circuit for the selector switch is closed at contact 104: off-normal contact 56, conductor 43, contacts 147, 137, 119, 129, 169*a*, 185, 104, 191, conductor 42, interrupter contact 52, magnet 51, battery. The selector switch accordingly is advanced automatically until the *a*-wipers of the switch reach home position 22. The opening of off-normal contact 56 in this position causes ground to be disconnected from the above homing circuit so that the switch is stopped, and causes the other locking circuit of relay 160 to be opened. Relay 160, in restoring, at contact 164 reconnects resistance battery to incoming test conductor 14. The selector is now fully released and available again for seizure in another call.

In the above description it was assumed that the calling subscriber dialled 7 as the first or group selecting digit. If the calling subscriber dials the digit "0" instead, the selector will be caused additionally to skip groups 7, 8 and 9 in the manner explained above for groups 5 and 6 so that at the end of the series of impulses wiper ends 31*a* to 39*a* are, at least temporarily, arrested in position 22 of the switch. In this connection it may be mentioned that the contact, 21, in the control bank CC of the selector switch corresponding to the last position of group 9 is wired to direct ground as shown in Fig. 2; this is possible in the case of the ninth group since, with 10 being the highest possible number of impulses in the group selecting series, there is no longer any danger of the switch getting ahead of the dial pulses even though wiper end 39*a* may thus be stepped from position 21 to position 22 before the impulse relay has reoperated at the end of the tenth impulse.

Since relay 160 is operated due to wiper 38*a* having previously passed position 1 on the fifth impulse of the series release of relay 180 at the end of the impulse series completes the ground connection to test relays 135, 145 as described above for trunk group 7 and accordingly the trunks of group 0 will now be tested and, if necessary, a trunk hunting operation initiated, substantially as described hereinbefore for trunk group 7. However, since off-normal contact 56 is open in position 22 of the selector switch, the ground connection for the self-interrupting circuit is obtained, in this position, only by way of contacts 159*b*, 169*d* and 168, the ground through contacts 159 and 169*d* also serving to hold relay 160 operated under this condition. In this connection it will be understood that when one of the two trunks of group 0 which are connected to position 22, is idle, relay 160 is released upon the release of relay 150 incident to the selector switching through to this trunk; and that at the end of such a call the selector switch simply remains in this position as there is no ground available for the homing circuit of the switch under this condition. On the other hand, if the call involves a trunk connected to one of the remaining positions of group 0, the reclosing of off-normal contact 56 in position 23 causes relay 160 to be held operated; and when the corresponding switching relay, 110 or 120, releases upon the termination of the call as explained in greater detail hereinafter, the homing circuit for magnet 51 is closed from ground at off-normal contact 56, the homing action of the switch being stopped and relay 160 being released only when off-normal contact 56 opens upon position 22 again being reached. In this exceptional case, it will be noted, the selector switch has completed a full, 360 degree revolution by the time it thus reaches its normal position upon release.

Assuming that the first digit dialled by the calling subscriber is a 1, the switch is advanced one step as described at the beginning of this section so that wiper ends 31*b* to 39*b* are moved into position 23 of the switch. Inasmuch as wiper end 38*a* engages the grounded contact in the CB bank of the switch only after a total of five steps as described above, relay 160 is not operated in this case and, as a result, the circuits for test relays 135, 145 are held opened at contacts 169*b* and 169*c*, respectively, so that none of the trunks of group 0 can be reached under this condition. Moreover, with relay 160 at normal and off-normal contact 56 operated, the following circuit is closed upon the release of relay 180, for busy relay 100: ground, contact 56, conductor 43, contacts 169, 156, 184, upper winding of relay 100, battery. Relay 100 locks over its contact 102 as before; at its contact 104 opens the self-interrupting circuit for stepping magnet 51; at contacts 105 and 106 opens another point in the circuits of test relays 135 and 145; at contact 101 closes a point in the busy tone circuit and at 103 closes an obvious circuit for relay 160. Relay 160 upon operating at its contacts 168 and 169*d* locks to ground at off-normal contact 56 and at contact 159*b* respectively; at contact 169 opens the last-traced operating circuit for relay 100; and at its contact 162 completes the busy tone circuit so that the calling subscriber's attention is called to the fact that he has dialled a wrong number. When subscriber A1 subsequently replaces his handset the release of the selector takes place substantially in the manner described above for an all-trunks-busy condition. It will be understood that the afore-mentioned advance of the selector switch by one step also may have been caused by an accidental impulse on the line rather than by a calling subscriber dialling the unused digit 1.

If the calling subscriber instead of dialling 1 dials any of the other unused digits 2, 3 or 4 the operation is substantially as described for digit 1 except, of course, that the switch is advanced 2, 3 or 4 steps in these cases, the fourth step moving the switch into its vacant or wiper brush position. In connection with the dialling of digit 3 it may also be mentioned that in this particular instance relay 190 is operated, upon the release of relay 170 at the end of the digit, from ground connected to the twenty-fifth contact in the CA bank of the switch, but the operation of relay 190 is without effect at this time.

If the calling subscriber abandons the call without dialling any digit whatever the release of line relay 130 incident to the disconnecting operation of the calling subscriber, causes the operation of magnet 51 in multiple with relay 170 which, in turn, operates its slave relay 180. Upon the subsequent release of relays 140 and 150 the circuit of magnet 51 is re-opened at contact 155 so that the switch is stepped off its normal position, thereby causing the closure of off-normal contact 56. Accordingly, the following circuit is closed with relay 180 still in operated condition: contact 56, conductor 43, contacts 169, 157, 184, winding of relay 100, battery. Relay 100 at its contact 103 energizes the winding of relay 160, and in order to insure the safe operation of relay 160 in spite of the immediate re-opening of the operating circuit of relay 100 at contact 169 of relay 160, relay 100 is arranged to be temporarily held in a locking circuit extending to ground by way of contacts 102 and 181. Relay 160 upon operating, at contact 168 locks to off-normal contact 56 and at contact 169*a* closes a point in the homing circuit of the selector switch. Upon the release of relays 170 and 180 the last-mentioned locking circuit of relay 100 is opened at 181 so that relay 100 restores and the homing circuit of the switch is completed at contacts 185 and 104. The homing of the switch and eventual release of relay 160 then take place as previously described.

In the embodiment of the selector illustrated in the drawings and described hereinbefore it has been assumed that six groups of trunks are to be connected to the switch. If more than six groups are to be accommodated, a correspondingly smaller number than four impulses of the group-selecting digit should be absorbed, and this could be accomplished by letting the switch normally rest in another than the first position of group 0. For example, if six groups are needed, the off-normal contact would be arranged to open in position 23 which is the second position of group 0; and if this additional sixth group which would then be numbered four, is to comprise more than two trunks or one switch position, the number of trunks in the other groups, of course, will have to be correspondingly decreased. Conversely, if less than six groups were to be accommodated and, accordingly, more than four impulses to be absorbed, the switch would be arranged to have its normal position in a position of a group preceding group 0. Thus, if the switch were to have access to a total of five groups, the switch would be made normally to rest in position 21 which corresponds to the last position of group 0.

*Connector operation*

Reverting now to the operation of the connectors, Figs. 3, 4, in setting up a connection from subscriber A1 to subscriber A2, it will be recalled that relays 320 and 330 were operated incident to the switch-through of the selector, with the results described above. When relay 340 operates upon the energization of its winding at contact 333 of hold relay 330, it functions among others, to tie conductors 74 and 75 together by way of contacts 307, 383 and 345, thereby connecting connector magnet 85 in series with its interrupter contact 86 and contacts 413 and 423 to the common control wiper, CC, of the connector switch.

When calling subscriber A1 actuates his dial in accordance with the second or tens digit 2 of the called party's number, line relay 320 of the connector, in releasing in response to the first impulse of this digit, at its break contact 322 causes the operation of changeover relay 360 which serves for the supervision of the tens, units and station digits, over the following circuit: ground, contacts 322, 343 and 353, winding of relay 360, battery. The circuit of hold relay 330 is opened on each impulse at make contact 321 of the line relay but due to its slow-to-release characteristics, relay 330 remains operated throughout each impulse series received thereby. Relay 360, in operating, at contact 362 closes an obvious circuit through the upper winding of its auxiliary relay 370. Upon its operation relay 370 at its contact 371 short-circuits its lower winding, thereby rendering itself slow-to-release; and at its contact 372 ties control conductor 71 to make contact 321 of impulse relay 320. However, since the last-mentioned contact is open at this time the switch remains, for the time being, in its normal position 52.

When impulse relay 320 re-operates at the end of the first impulse, the circuit of changeover relay 360 is opened at break contact 322 but as relay 360 is of the slow-releasing type it remains operated throughout the series of impulses. Also upon the re-operation of impulse relay 320 the following circuit for connector magnet 85 is closed at make contact 321 of this relay in parallel with the winding of hold relay 330: ground, contacts 321, 372, control conductor 71, control contact 52 of the connector switch, control wiper CC in its normal position, conductor 75, contacts 345, 383, 307, conductor 74, contacts 423, 413, interrupter contact 86, winding of connector magnet 85, battery. Since interrupter contact 86 is included in this circuit the switch is immediately stepped off into position 1.

Should the tens series of impulses contain no other impulses, the connector switch would remain in position 1 which corresponds to the first position of tens group 1 until it is, or is not as the case may be, further advanced to other positions of this group incident to the receipt of the units digit as explained hereinbelow. In the instant case it has been assumed that a 2 has been dialled as the tens digit. Accordingly, when impulse relay 320 releases again at the beginning of the second impulse of the series, the following new circuit is closed for connector magnet 85 in multiple with the winding of changeover relay 360: ground, break contact 322 of impulse relay 320, contacts 343, 353, conductor 70, control contact 1 of the connector switch, control wiper CC in position 1, control conductor 75, contacts 345, 383, 307, conductor 74, contacts 423, 413, interrupter contact 86, winding of connector magnet 85, battery. The switch then is immediately advanced into position 2 by means of interrupter contact 86. As shown in Fig. 4 control contacts 2, 3 and 4 are wired directly to ground so that the connector switch is at once advanced into position 5, independently of the condition of impulse relay 320, in a manner requiring no further elaboration.

When relay 320 re-operates at the end of second impulse which may occur simultaneously with, or prior to, or subsequent to the switch wipers reaching position 5 another stepping circuit is closed for the connector magnet with the switch in position 5, this circuit among others including make contact 321 of the impulse relay and control conductor 71 which is multipled to control contact 5. The actuation of interrupter contact 86 upon the energization of magnet 85 in this circuit causes the switch to be immediately advanced into position 6 which accommodates the first pair of subscribers lines of tens group 2. As there are no more impulses in this series, the connector switch is, at least temporarily, arrested in this position. More generally speaking it will be understood from the foregoing description that the group-skipping movement of the connector switch is controlled substantially in the same manner as in the case of the selector so that the switch, at the end of the *n*th impulse of the impulse series controlling its group selection, is positioned on the position accommodating the first pair of outlets of the *n*th group.

At the time the connector switch moved from position 52 into position 1, its off-normal contacts 55—57, Fig. 3, were actuated so that off-normal contact 55 closed a point in the circuit of relay 380. When relay 360 releases at the end of the tens digit due to its circuit being permanently opened at contact 322, the circuit of the upper winding of relay 370 is opened at contact 362 so that relay 370 also releases, with a slight delay due to the short circuit across its lower winding. At contact 373 of relay 370 the following circuit is accordingly completed for relay 380: ground, contacts 344, 373, 55, winding of relay 380, battery. Relay 380, in operating, at its contact 382 locks directly to ground at contact 344 of auxiliary hold relay 340; at 383 further disables the group-skipping circuit of the connector switch by disconnecting conductor 75 from conductor 74; and at 381 closes a point in the circuit of the winding of auxiliary switch magnet 87.

When the calling subscriber actuates his calling device in accordance with the third or units digit, 5, of the called subscriber's number, line relay 320 of the connector restores responsive to the first impulse of this digit, thereby causing the sequential operation of relays 360 and 370 as described above for the tens digit. At break contact 322 the following circuit is closed, moreover, for magnet 87 of the auxiliary switch in multiple with the winding of relay 360: ground, contacts 322, 343, 353, 381, conductor 82, wiper AC3 of the auxiliary switch in its normal position, contact 22 of the AC3 bank, winding of magnet 87, battery. Upon the re-operation of impulse relay 320 at the end of the first impulse, this circuit is reopened at break contact 322 so that magnet 87 releases, thereby advancing the auxiliary switch from its normal position into position 1. The opening and closing of interrupter contact 88 during this digit has no effect on the operation of the circuit. The actuation of off-normal contacts 92, 93 incident to the auxiliary switch leaving its normal position also is without effect at this time.

Upon the next release of line relay 320 which occurs in response to the second impulse of the digit, the following circuit slightly different from the one last traced, is closed for magnet 87 of the auxiliary switch: ground, contacts 322, 343, 353, 381, 376, conductor 83, winding of magnet 87, battery. This circuit is re-opened upon the re-operation of relay 320 at the end of the impulse and the auxiliary switch accordingly advanced into position 2. The remaining three impulses of the units digit advance the auxiliary switch in a similar manner on a one-step-per-impulse basis so that the switch wipers at the end of the impulse series, are positioned in position 5.

It will be noted from an inspection of Figs. 3 and 4 that magnet 85 of the connector switch is connected by way of conductor 76 and contact 348 to conductor 77 and that the last-mentioned conductor is multipled to even-numbered contacts 2, 4, 6 and 8 in the AC3 bank of the auxiliary switch. Accordingly, while impulse relay 320 is in released condition with the auxiliary switch in position 2 and then again when this relay is in released condition with the auxiliary switch in position 4, the following circuit is momentarily closed for connector magnet 81: ground, contacts 322, 343, 353, 381, conductor 82, wiper AC3 on contact 2 and 4 respectively of the AC3 bank, conductor 77, contact 348, conductor 76, winding of connector magnet 85, battery. In each of these two instances the circuit of the magnet winding is broken upon the opening of contact 322 incident to the re-operation of the impulse relay and the connector switch advanced one step. At the end of units digit 5, this switch accordingly is positioned in position 8 in which the fifth and sixth subscriber's line of tens group 2 are accommodated. It will further be observed from an inspection of Fig. 4 that the lower winding of odd switching relay 410 associated with the first or upper wiper set of the connector switch, is connected to odd positions 1, 3, 5, 7 and 9 of the AC1 bank of the auxiliary switch, and that the lower winding of even switching relay 420, associated with the second or lower wiper set of the connector switch, is connected to even positions 2, 4, 6, 8 and 10 of this AC1 bank. Since in the instant example, the units digit is 5, odd-switching relay 410 is enabled at the end of this digit to test the called subscriber's line for its idle condition by way of test conductor 99 as will now be explained.

When relay 360 releases at the end of the units digit due to its circuit being held open at contact 322, the circuit of the upper winding of relay 370 is opened at contact 362 as before, but before relay 370 releases, the following circuit is closed for switching relay 410 provided that the line, 96, of the called party is idle: ground, contacts 346, 363, 374, conductor 80, auxiliary switch wiper AC1 in position 5, lower winding of relay 410, connector switch wiper C1 in position 8, test conductor 99 of the called party's line and from there through the winding of the cut-off relay (not shown) associated with the corresponding line switch to battery. Relay 410, in operating, at its preliminary or "X" contact 414 locks to ground by way of conductor 68 and contact 342; at contacts 411, 412 prepares the ringing circuit; at 413 opens another point in the self-interrupting circuit of the connector magnet; at 416 closes a point in the ring-back tone circuit; and at 415 connects direct ground to the C1 wiper of the connector switch, thereby to render the called line busy to other connectors.

When relay 370 restores at the end of its release delay period, the last-traced operating circuit of relay 410 is opened at contact 374, and at contact 375 the following self-interrupting circuit is closed for magnet 87 of the auxiliary switch: ground, contacts 346, 363, 375, conductor 81, AC2 wiper of the auxiliary switch in position 5, interrupter contact 88, winding of magnet 87 battery. Due to the action of its interrupter contact 88 the auxiliary switch is accordingly advanced into position 6; and, since the break spring of the last-mentioned contact is wired to the AC2 contacts in each of positions 1–10 of the auxiliary switch, the switch is further automatically advanced until it reaches position 11. In this position, the *a*-wiper ends of the auxiliary switch have just disengaged their associated contact banks, the *b*-end of wiper AC3 engages a bank contact wired to magnet 87, and the *b*-ends of wiper AC2 and AC4 are about to engage the first contact of their associated contact banks which are used for purposes of ringing selection.

Referring again to the way in which conductor 77 is wired to the AC3 bank of the auxiliary switch and remembering that this conductor is energized through break contact 322 of the line relay it will be understood from the foregoing description that if the units digit is 1 or 2, no advancement of the connector switch takes place incident to these units digits so that the connector switch remains in the first position of the selected group accommodating the first and second line of this group; and that the connector switch is advanced one step responsive to units digit 3 or 4, two steps responsive to units digit 5 or 6, three steps responsive to units digit 7 or 8 and four steps responsive to units digit 9 or 10 so as to be positioned on the second, third, fourth and fifth position respectively of the selected group of lines at the end of these digits. Referring again to the wiring of the AC1 bank it will also be understood that at the end of odd units digits such as 1, 3, 5, 7 or 9 odd switching relay 410 is enabled to test the line connected to the upper set of connector banks in the selected position for its idle condition, while at the end of even units digit 2, 4, 6, 8 or 0 even switching relay 420 is enabled to test the line connected to the lower set of connector banks in the selected position for its idle condition.

The calling subscriber at substation A1 actuates his calling device in accordance with the ringing selecting or station digit, 6, which is the final digit of the called subscriber's number. Upon the release of line relay 320 responsive to the first impulse of this digit, relays 360 and 370 are again operated in this order, and the following circuit for magnet 87 of the auxiliary switch is closed at contact 322 in multiple with the winding of relay 360: ground, contacts 322, 343, 353, 381, conductor 82, wiper AC3 in position 11, winding of magnet 87, battery. When line relay 320 re-operates at the end of the first impulse, the last-traced circuit of magnet 87 is re-opened at contact 322 and the magnet releases, advancing the auxiliary switch into position 12. In this position another circuit for magnet 87 is closed upon the second release of the impulse relay, this circuit being similar to the one last traced except extending from contact 381 by way of contact 376 and conductor 83 directly to magnet 87. Upon re-operation of the impulse relay this circuit is re-opened and the auxiliary switch, therefore, stepped into position 13. In a similar manner, this switch is advanced one step for each of the remaining four impulses of the station digit with the result that the auxiliary switch is arrested in its position 17 at the end of this digit.

When both relays 360 and 370 have restored at the end of the digit the following circuit, accordingly, is closed for side-of-line-switching relay 390: ground, contacts 346, 363, 375, conductor 81, wiper AC2 in position 17, conductor 73, winding of relay 390, battery. Relay 390, in operating, at its contacts 391, 392 and 393, 394 reverses the live generator and ground connections to the two sides of the line respectively, the ringing circuit being more particularly traced hereinbelow; and at 395 causes the operation of relay 350 from the afore-mentioned ground on conductor 73. Relay 350, upon operating, connects the ring-back tone conductor to the negative side of the line as a signal to the calling party that ringing is about to commence, this connection extending from ring-back tone conductor 90 which is connected to any suitable source of ringing current, through contacts 416 and 426, limiting condenser 89, conductor 67 and contacts 351 and 302 and condenser 61 to incoming talking conductor 51; at its contact 353 further disables the impulse circuit; and at contact 354 connects pick-up conductor 54 by way of contact 337 to the winding of pick-up relay 335.

The connector circuit shown in Figs. 3 and 4 facilitates the use of various methods of ringing. Thus, conductors G1 to G10, Fig. 4, may all be connected to ringing current sources of different frequencies or to ringing current sources of the same or different frequency but of different code. Furthermore, if divided ringing is to be used, only five instead of ten frequencies or codes may be provided; in this case the same frequency or code is connected, for example, to conductors G1 and G2, G3 and G4, G5 and G6, G7 and G8, G9 and G10, the wipers of five substations of a given 10-party line are connected to one side of the line and those of the other five substations to the other side of the line in a well known manner, and side-of-line switching relay 390 is used to cause the ringing current to be projected over the positive side of the line on all even station digits and the negative side of the line on all odd station digits. Thus, assuming that in the instant example divided code ringing is used, then inasmuch as the station digit of the called part is 6, the ringing code connected to conductor G6 has been selected, and the operation of side-of-line switching relay 390 by virtue of the fact that 6 is an even digit, causes ringing current of this code to be projected over the positive side of the line so that the bell, not shown, at substation A2 is rung, this bell being connected at this substation to the positive side of the line.

The ringing circuit is completed at contact 336 of pick-up relay 335 as soon as this relay operates from a ground pulse applied to pick-up conductor 54 in the interval between successive codes in the well known manner, this relay opening its operating circuit at contact 337 and locking to ground on conductor 73 by way of contacts 338 and 395. The ringing circuit may be traced as follows: battery-connected coded generator on conductor G6, wiper AC4 of the auxiliary switch in position 17, conductor 69, lower winding of ring cut-off relay 300, contacts 336, 392 and 304, conductor 66, contact 412, +1 wiper of connector switch, positive conductor 98 of line 96, and from there through the ringer and condenser, not shown, at substation A2 to ground. Relay 300 which is slow-to-operate cannot operate responsive to the mere flow of alternating current through its lower winding.

Before proceeding with the description of the instant call to substation A2 it may be mentioned at this point that the other party, A3, of party-line 96 is assumed to have his ringer connected to the negative side of the line and that, accordingly, an odd station digit such as 5 is assigned to this party. If 5 instead of 6 is dialled as the station digit, conductor G5 rather than G6 is selected by wiper AC4 of the auxiliary switch. Conductors 65 and 66 are connected to the same ringing code as assumed above. However, with wiper AC2 in position 16 of the auxiliary switch, conductor 72 rather than 73 is grounded at the end of this digit so that side-of-line switching relay 390 is not operated in this case and relay 350 operated directly from ground on conductor 72. With relay 390 unoperated, the coded generator is transmitted over the negative conductor, 97, of line 96 with the result that the bell as substation A3 is rung.

Reverting again to the call from subscriber A1 to A2, the last-mentioned subscriber upon hearing his code sounded by the bell at his substation, answers the call by lifting his handset off the cradle, thereby closing a direct loop over line 96 in the well known manner. This loop circuit may be traced as follows: ground, contacts 394 and 301, conductor 65, contact 411, −1 wiper of connector switch in position 8, conductor 97 of line 96, closed switchhook contact, not shown, at substation A2, conductor 98 of line 96, +1 wiper of connector switch in position 8, contact 412, conductor 66, contacts 304, 392 and 336, lower winding of relay 300, conductor 69, AC4 wiper of auxiliary switch in position 17, conductor G5, coded generator, not shown, battery. Ring cut-off relay 300 operates in this circuit sufficiently to close its preliminary or "X" contact 306, whereupon the relay operates fully due to the energization of its upper winding from ground at contact 342. Relay 300, when fully operated, at its contacts 301 and 304 opens the ringing circuit; at its contacts 303 and 305 connects the called loop to the windings of back-bridge relay 310; and at 302 opens the ring-back tone circuit.

Relay 310, in operating, at its contacts 311, 312 and 313, 314 reverses the battery polarity to the calling end of the connection in the well known manner, this polarity reversal, however, being ineffective in the instant case as neither answering supervision nor metering is involved in a call originating from substation A1; at contact 315 connects a multiple ground to the winding of auxiliary hold relay 340; and at contact 316 removes a ground connection to supervisory conductor 58 which had momentarily become effective upon the closure of contact 308 incident to the operation of relay 300. Conductor 58 serves to provide an indication to the exchange personnel of the failure on the part of either the calling or called party to release the connection at the end of a call as described hereinafter, for example by means of a battery-connected supervisory lamp, not shown, which is connected to the other end of this conductor. The two subscribers may now enter into a conversation by way of condensers 61, 62, transmission battery being provided to the calling party through the winding of line relay 320 and to the called party through the winding of back-bridge relay 310.

At the end of the conversation, when the calling party replaces his handset, line relay 320 of the connector restores, thereby opening the circuit of relay 330 at 321. Relay 330 upon releasing opens its contact 333, but as the present connector is of the last-party-release type, ground remains connected to the winding of relay 340 through contact 315 of back-bridge relay 310 provided the called party has not disconnected as yet; therefore, relay 340 remains operated for the time being, in turn holding relays 350, 380, 335, 390, 300 and 410 in operated condition. The circuit to the supervisory lamp, not shown, accordingly is closed by way of contacts 322, 343, 352, 308 and conductor 58, whereby the maintenance personnel is advised of the fact that one of the two subscribers is still holding his line. When relay 330 restores it also removes ground from incoming test conductor 53, thereby causing the release of the preceding switches as described below, and further closes its contact 331; but since resistance battery remains disconnected from conductor 53 at off-normal contacts 57, Fig. 3, and 93, Fig. 4, the connector is not made available to other calls at this time.

With holding ground removed from conductor 53, switching relay 110, Fig. 1, in the selector restores, thereby, at its contacts 112 and 114 opening the connections to talking wipers −1 and +1 of the selector switch, and at its contact 119 completing the above-traced homing circuit for selector switch magnet 51. The wipers of the selector switch are accordingly advanced until the last-mentioned homing circuit is opened at off-normal contact 56 upon the switch reaching its normal position 52. When contact 56 opens in this position ground is removed, moreover, from the winding of relay 160 so that this relay releases, reconnecting at its contact 164 resistance battery to incoming test conductor 14 by way of contact 141. The selector switch together with its associated relay equipment has thus returned to normal condition and may therefore be seized in another call. The line equipment associated with switch 20 had previously returned to normal condition when its switching relay released upon the removal of ground from test conductors 53 and 14.

When the called subscriber, A2, subsequently disconnects also, back-bridge relay 310 restores, thereby opening at contact 315 the circuit of relay 340. Relay 340, in releasing, at contact 346 removes ground from wiper AC2 of the auxiliary switch, thereby permitting relays 350, 335 and 390 to restore; at contact 344 causes the release of relay 380; and at contact 342 causes the delayed release of relay 300. Relay 300 in restoring, among others removes ground from supervisory conductor 58 at contact 308, thereby causing the supervisory lamp to be extinguished. The following homing circuits are now closed for the connector switch and auxiliary switch respectively: ground, contact 347, conductor 78, off-normal contact 92 of the auxiliary switch, interrupter contact 88, auxiliary switch magnet 87, battery; and: ground, contact 341, connector off-normal contact 56, contact 307, conductor 74, contacts 423 and 413, interrupter contact 86, connector magnet 85, battery. Accordingly both switches are simultaneously and independently advanced to their respective normal positions in which the switches are arrested due to the opening of off-normal contacts 92 and 56 respectively. Resistance battery is now re-connected to incoming test conductors 53 by way of off-normal contact 93 of the auxiliary switch, conductor 79, off-normal contact 57 of the connector switch and contacts 377, 361 and 331 so that the connector is now available again for seizure in other calls.

In case the called party, A2, is the first to release back-bridge relay 310 restores. At its contacts 311, 312 and 313, 314 release supervision is returned by reversing the polarity on incoming talking conductors 51, 52 back to normal, this polarity reversal, however, being without effect in the instant example. At contact 316 relay 310 connects ground by way of contact 308 to supervisory conductor 58 to light the supervisory lamp and thereby advise the maintenance personnel of the fact that the connector is still held by one of the two parties; and at contact 315 relay 310 removes a ground from the winding of relay 340. Subsequently, when the calling party A1 likewise replaces his handset, relays 320 and 330 restore in this order so that the preceding switches are released by removal of ground from conductor 53 at contact 332 as described above. At contact 333 the circuit of relay 340 is opened and this relay permitted to restore. From hereon the release of the connector circuit and the homing of the auxiliary and connector switch take place in the same manner as explained above.

If the calling subscriber abandons the call prematurely the release of the connector also is effected in a manner similar to that explained. Assuming, for example, the call is abandoned prior to the receipt of the units digit, the auxiliary switch will still be stepped off-normal since, during the release time of relays 330 and 340, the impulse circuit to the auxiliary switch magnet is momentarily closed by way of contacts 322, 343, 353, 381, conductor 82 and the AC3 wiper of the auxiliary switch in position 22. Upon the release of relay 340 both switches are then homed by means of the homing circuits traced above. If the calling party abandons the call after seizure of the connector but without the dialling of any further digit, the connector switch remains in its normal condition since, as explained above, this switch is stepped off-normal only upon reoperation of line relay 320 after the first impulse of the tens digit; and the auxiliary switch also remains in its normal position as relay 380 is not operated under this condition. Changeover relay 360 and its auxiliary relay 370 are momentarily operated during the release time of relays 330 and 340 but restore again after the release of relay 340. The preceding switches are released when ground is disconnected from conductor 53 at contact 332 of relay 330, and resistance battery is reconnected to this conductor at contact 377 upon the release of relay 370.

In the above description of a call from substation A1 and A2 it was assumed that the line, 96, of the called party was idle at the time relay 360 released at the end of the units digit with auxiliary switch wiper AC1 in position 5. If, on the other hand, line 96 is busy at this time in either an outgoing or incoming call so that ground is connected to conductor 99, the circuit for the lower winding of switching relay 410 cannot be completed and this relay, therefore, remains in released condition. At the end of its release delay period relay 370 also restores, thereby at its contact 374 opening the ground connection to the left-hand terminal of the lower winding of relay 410 to terminate the test interval. Busy tone is subsequently connected to the calling end when relay 350 operates at the end of the station digit as described above, this connection of busy tone extending from busy tone conductor 91 by way of contacts 417 and 427, condenser 89, conductor 67, contacts 351 and 302 and condenser 61 to incoming talking conductor 51. Relays 390 and 335 also operate as described for the idle case but the operation of these relays is without effect when the called line is busy as switching relay 410 is not operated. When the calling subscriber, upon hearing the busy signal, replaces his handset the connector and the preceding switches are restored to normal, incident to the release of relays 320, 330 and 340, substantially as above described.

While only two embodiments of this invention have been illustrated and described, it is to be understood that numerous modifications in the details of arrangement may be resorted to without departing from the true spirit and scope of the invention as defined in the appended claims.

What is claimed is:

1. In combination with a numerical switch of the single-motion stepping type having a stepping magnet, an interrupter contact for said magnet and a set of wipers and contact banks, certain of the banks of said switch having a plurality of groups of outlets connected thereto, the outlets of each group extending over a number of switch positions and each group having a start position in continuity with outlet positions of the corresponding group, said set also including a control wiper and bank, a pulsing circuit incoming to said switch, an impulse relay associated with said switch and having a break contact, said relay being operated in said pulsing circuit and being released responsive to the opening of said circuit on each of a series of numerical impulses transmitted thereover start connections extending through said break contact to contacts of said control bank corresponding to the start positions of a plurality of said groups in multiple, a stepping circuit including said break contact, said start connections, a given one of said start contacts, said control wiper, said interrupter contact and stepping magnet, said stepping circuit being controlled by said break contact for causing said switch to be stepped off said start contact incident to the release of said impulse relay on one of said numerical impulses, additional connections to said control bank in all positions intermediate a given start position and the next start position, said additional connections being independent of said break contact, and additional stepping circuits extending over said additional connections and said control wiper for stepping said switch over said intermediate positions, whereby the wipers of said switch are advanced, concurrently with the receipt of said series of impulses, over positions corresponding to an unwanted group or groups to the start position of the wanted group.

2. In a telephone system, a train of connecting switches, including a numerical switch of the single-motion stepping type having a stepping magnet, an interrupter contact for said magnet and a set of wipers and contact banks including a pair of line wipers and banks and a control wiper and bank, said line banks having a plurality of groups of outlets connected thereto, the outlets of each group extending over a number of switch positions and each group having a start position in continuity with outlet positions of the corresponding group, a pulsing circuit incoming to said switch, an impulse relay associated with said switch and having a break contact, said relay being operated in said pulsing circuit and being released responsive to the opening of said circuit on each of a series of numerical impulses transmitted thereover start connections extending through said break contact to contacts of said control bank corresponding to the start positions of a plurality of said groups in multiple, a stepping circuit including said break contact, said start connections, a given one of said start contacts, said control wiper, said interrupter contact and stepping magnet, said stepping circuit being controlled by said break contact for causing said switch to be stepped off said start contact incident to the release of said impulse relay on one of said numerical impulses, additional connections to said control bank in all positions intermediate a given start position and the next start position, said additional connections being independent of said break contact, and additional stepping circuits extending over said additional connections and said control wiper for stepping said switch over said intermediate positions, whereby the wipers of said switch are advanced, concurrently with the receipt of said series of impulses, over positions corresponding to an unwanted group or groups to the start position of the wanted group.

3. The combination as claimed in claim 2, characterized in that outlets of the group defined by the highest possible number of impulses in said series are connected to positions intermediate those corresponding to the first two of said start positions, whereby the first impulse of said series is absorbed by ineffectively advancing the wipers of said switch over outlets of the last-mentioned group, and that there are provided means effective incident to such advance for enabling said switch to seize said outlets at the time said outlets are re-engaged subsequent to one traverse of said banks by said wipers.

4. In a telephone system, a train of connecting switches including a numerical switch, of the single-motion stepping type having a stepping magnet, an interrupter contact for said magnet and a set of wipers and contact banks including a pair of line wipers and banks and a control wiper and bank, said line banks having a plurality of groups of outlets connected thereto, a pulsing circuit incoming to said switch, an impulse relay associated with said switch and having a break contact, said relay being operated in said pulsing circuit and being released responsive to the opening of said circuit on each of a received series of numerical impulses transmitted thereover, start connections connected to said break contact and to predetermined contacts of said control bank each provided in the position accommodating the first outlet of a corresponding one of said plurality of groups, a stepping circuit including said break contact, said start connections, a given one of said predetermined control contacts, said control wipers, said interrupter contact and stepping magnet, said stepping circuit being controlled by said break contact for causing said switch to be stepped off said predetermined contact incident to the release of said impulse relay on one of said numerical impulses, additional connections to said control bank in all positions intermediate a given start position and the next following start position, said additional connections being independent of said break contact, and additional stepping circuits extending over said additional connections and said control wiper for stepping said switch over said intermediate positions, whereby the wipers of said switch are advanced, concurrently with the receipt of said series of impulses, over positions corresponding to an unwanted group or groups to the position accommodating the first outlet of the wanted group.

5. A selector switch of the single-motion stepping type having a stepping magnet, an interrupter contact for said magnet and a set of wipers and contact banks including talking wipers and banks, said talking banks having a plurality of groups of trunks connected thereto, said set also including a control wiper and bank, said control wiper being connected by way of said interrupter contact and stepping magnet to a first electric potential, and said switch having associated therewith an impulse relay responsive to a received series of numerical impulses and having a break contact, start connections connected at one end to a second potential by way of said break contact and multipled at the other end to predetermined contacts of said control bank each provided in a start position for a corresponding one of said plurality of groups, additional connections of said second potential to said control bank in all positions intermediate a given start position and the next-following start position, said additional connections being independent of said break contact and said switch being stepped, by means of said additional connections, over said intermediate positions, whereby the wipers of said switch are advanced, concurrently with the receipt of said series of impulses, over positions corresponding to an unwanted group or groups to the start position of the wanted group, means effective upon the termination of said series of impulses for starting said switch on a trunk hunting operation beginning from said start position in search of an idle trunk in said group, and means effective upon an idle trunk being found for switching said switch through to said trunk by way of said talking wipers.

6. The combination as claimed in claim 5, characterized in that outlets of the group defined by the highest possible number of impulses in said series are connected to positions intermediate those corresponding to the first two of said start positions, whereby the first impulse of said series is absorbed by ineffectively advancing the wipers of said switch over outlets of the last-mentioned group, and that there are provided means effective incident to such advance for enabling said switch to seize such outlets at the time said outlets are re-engaged subsequent to one traverse of said banks by said wipers.

7. A selector switch of the single-motion stepping type having a stepping magnet, an interrupter contact for said magnet, and a set of wipers and contact banks including talking wipers and banks, said talking banks having a plurality of groups of trunks connected thereto, said set also including a control wiper and bank, said control wiper being connected by way of said interrupter contact and stepping magnet to a first electric potential, and said switch having associated therewith an impulse relay intermittently released and reoperated in response to a received series of numerical impulses, first impulse contacts closed upon the release of said impulse relay, second impulse contacts closed upon the operation of said impulse relay, three control conductors, the first conductor connected at one end to a second potential by way of said first impulse contact and multipled at the other end to predetermined contacts of said control bank each provided in a start position for a corresponding one of said plurality of groups, the second conductor connected at one end to said second potential by way of said second impulse contact and multipled at the other end to predetermined contacts of said control bank each provided in a position other than the start position of the corresponding group, and the third conductor being connected at one end to said second potential independently of the condition of said impulse relay and multipled at its other end to the contacts of said control bank intermediate said predetermined contacts, whereby the wipers of said switch are advanced, concurrently with the receipt of said impulses and without the danger of over-running said impulses, over positions corresponding to an unwanted group or groups to the start position of the wanted group, means effective upon the termination of said series of impulses for starting said switch on a trunk hunting operation beginning from said start position in search of an idle trunk in said group, and means effective upon an idle trunk being found for switching said switch through to said trunk by way of said talking wipers.

8. In combination with a selector switch of the single-motion stepping type having a stepping magnet, an interrupter contact for said magnet and two sets of wipers and contact banks including two pairs of talking banks and two test banks, the individual trunks of each of a plurality of trunk groups being connected in pairs to the banks of said two sets, said switch also having a control wiper and bank, a pulsing circuit incoming to said switch, an impulse relay associated with said switch and having a bank contact, said relay being operated in said pulsing circuit and being released responsive to the opening of said circuit on each of a series of numerical impulses transmitted thereover, start connections connected to said break contact and to predetermined contacts of said control bank each provided in the position accommodating the first pair of trunks of a corresponding one of said plurality of groups, a stepping circuit including said break contact, said start connections, a given one of said predetermined control contacts, said control wiper, said interrupter contact and stepping magnet, said stepping circuit being controlled by said break contact for causing said switch to be stepped off said predetermined contact incident to the release of said impulse relay on one of said numerical impulses, additional connections to said control bank in all positions intermediate a given start position and the next-following start position, said additional connections being independent of said break contact, additional stepping circuits extending over said additional connections and said control wiper for stepping said switch over said intermediate positions, whereby the wipers of said switch are advanced, concurrently with the receipt of said series of impulses, over positions corresponding to an unwanted group or groups to the position accommodating the first pair of trunks of the wanted group, means effective upon the termination of said series of impulses for starting said switch on a double-trunk-hunting operation over said two test wipers, beginning from the last-mentioned position, in search of an idle trunk in said group and means effective upon an idle trunk being found for switching said switch through to said trunk over the corresponding set of wipers.

9. A connector switch of the single-motion stepping type having a stepping magnet, an interrupter contact for said magnet, and a set of wipers and contact banks including talking wipers and banks, said talking banks having a plurality of groups of outlets connected thereto, said set also including a control wiper and bank, said control wiper being connected by way of said interrupter contact and stepping magnet to a first electric potential, and said switch having associated therewith an impulse relay responsive to a plurality of received series of numerical impulses and having a break contact, start connections connectable at one end to a second potential by way of said break contact and connected at the other end to predetermined contacts of said control bank each provided in a start position for a corresponding one of said plurality of groups, additional connections of said second potential to said control bank in all positions intermediate a given start position and the next-following start position, said additional connections being independent of said break contact, and said switch being stepped by means of said additional connections, over said intermediate positions, whereby the wipers of said switch are advanced, concurrently with the receipt of one of said series of impulses, over positions corresponding to an unwanted group or groups to the start position of the wanted group, a circuit independent of said interrupter contact and controlled by said impulse relay in response to the receipt of another of said series of impulses for subsequently advancing said switch from the last-mentioned start position to a position corresponding to a desired outlet within the wanted group, and means effective upon the last-mentioned advance, if said outlet is idle, for switching said switch through by way of its talking wipers.

10. A connector switch of the single-motion stepping type having a stepping magnet, an interrupter contact for said magnet and a set of wipers and contact banks including talking wipers and banks, said talking banks having a plurality of groups of outlets connected thereto, said set also including a control wiper and bank, said control wiper being connected by way of said interrupter contact and stepping magnet to a first electric potential, and said switch having associated therewith an impulse relay intermittently released and reoperated in response to each of a plurality of received series of numerical impulses, first impulse contacts closed upon the release of said impulse relay, second impulse contacts closed upon the operation of said impulse relay, three control conductors, the first conductor connected at one end to a second potential by way of said first impulse contact and multipled at the other end to contacts of said control bank each provided in a start position for a corresponding one of said plurality of groups, the second conductor connected at one end to said second potential by way of said second impulse contact and multipled at the other end to predetermined contacts of said control bank each provided in a position other than the start position of the corresponding group, and the third conductor being connected at one end to said second potential independently of the condition of said impulse relay and multipled at its other end to the contacts of said control bank intermediate said predetermined contacts, whereby the wipers of said switch are advanced, concurrently with the receipt of said impulses and without the danger of over-running said impulses, over positions corresponding to an unwanted group or groups to the start position of the wanted group, a circuit independent of said interrupter contact and controlled by said impulse relay in response to the receipt of another of said series of impulses for subsequently advancing said switch from the last-mentioned start position to a position corresponding to a desired outlet within the wanted group, and means effective upon the last-mentioned advance, if said outlet is idle, for switching said switch through by way of said talking wipers.

11. A connector comprising two switches of the single-motion stepping type each having a stepping magnet and a set of wipers and contact banks, a plurality of groups of outlets connected to certain of said banks of said first switch, said first switch also having a control wiper and bank, an impulse relay responsive to a plurality of received series of numerical impulses, an interrupter circuit for the magnet of said first switch activated under the joint control of said impulse relay and said control wiper and bank for causing the magnet of said first switch to be operated, responsive to and concurrently with the receipt of one of said impulse series, a given number of times per numerical impulses, whereby the wipers of said first switch are advanced over positions corresponding to another of an unwanted group or groups to the start position of the wanted group, a stepping circuit for the magnet of said second switch controlled by said impulse relay for setting the wipers of said second switch in accordance with another of said impulse series, and stepping connections for the magnet of said first switch controlled incident to the setting of said second switch for advancing said first switch from said start position to a position corresponding to a wanted outlet within said wanted group.

12. A connector comprising two switches of the single-motion stepping type each having a stepping magnet and a set of wipers and contact banks, a plurality of groups of outlets connected to certain of said banks of said first switch, said first switch also having a control wiper and bank, an impulse relay responsive to a plurality of received series of numerical impulses, an interrupter circuit for the magnet of said first switch activated under the joint control of said impulse relay and said control wiper and bank for causing the magnet of said first switch to be operated, responsive to and concurrently with the receipt of one of said impulse series, a given number of times per numerical impulse, whereby the wipers of said first switch are advanced over positions corresponding to outlets of an unwanted group or groups to the start position of the wanted group, said second switch also having a control wiper and bank, a stepping circuit for the magnet of said second switch controlled by said impulse relay for advancing said second switch in accordance with another of said impulse series, and stepping connections between the last-mentioned control bank and the magnet of said first switch for advancing said first switch concurrently with said advancement of the second switch from said start position to a position corresponding to a wanted outlet within said wanted group.

13. A connector comprising two switches of the single-motion stepping type each having a stepping magnet and a set of wipers and contact banks, a plurality of groups of outlets connected to certain of said banks of said first switch, said first switch also having a control wiper and bank, an impulse relay responsive to a plurality of received series of numerical impulses, an interrupter circuit for the magnet of said first switch activated under the joint control of said impulse relay and said control wiper and bank for causing the magnet of said first switch to be operated, responsive to and concurrently with the receipt of one of said impulse series, a given number of times per numerical impulses, whereby the wipers of said first switch are advanced over positions corresponding to outlets of an unwanted group or groups to the start position of the wanted group, said second switch also having a control wiper and bank, a stepping circuit for the magnet of said second switch controlled by said impulse relay for advancing said second switch in accordance with another of said impulse series, and stepping connections from the second and following contacts of the last-mentioned control bank to the magnet of said first switch, for advancing said first switch, concurrently with said advancement of the second switch but beginning with the second impulse only of the last-mentioned series, from said first position to a subsequent position within said wanted group.

14. A connector comprising two switches of the single-motion stepping type and having a stepping magnet, said first switch having two sets of wipers and contact banks, the individual outlets of each of a plurality of groups of outlets being connected in pairs to the banks of said two sets, and said first switch also having a common control wiper and bank, an impulse relay responsive to a plurality of received series of numerical impulses, an interrupter circuit for the magnet of said first switch activated under the joint control of said impulse relay and said control wiper and bank for causing the magnet of said first switch to be operated, responsive to and concurrently with the receipt of one of said impulse series, a given number of times per numerical impulse, whereby the wipers of said first switch are advanced over positions corresponding to outlets of an unwanted group or groups to the start position of the wanted group, said second switch also having a set of wipers and contact banks, a stepping circuit for the magnet of said second switch controlled by said impulse relay for setting the wipers of said second switch in accordance with another of said impulse series, and stepping connections for the magnet of said first switch controlled by the setting of said second switch for advancing said first switch from said start position to a given position within said wanted group and for selecting the wiper set of said first switch giving access to the wanted outlet in said position.

15. A party line connector comprising two switches of the single-motion rotary stepping type each having a stepping magnet, said first switch having a set of wipers and contact banks, a plurality of groups of lines connected to certain of said banks, said set also including a control wiper and bank, an impulse relay responsive to a plurality of received series of numerical impulses, an interrupter circuit for the stepping magnet of said first switch extending over said control wiper, control connections to said control bank including two control conductors, said impulse relay being responsive to a first of said impulse series for causing said interrupter circuit to be energized alternately over said two control conductors, thereby to advance the wipers of said first switch, concurrently with the receipt of said impulse series, over positions corresponding to an unwanted group or groups to a start position for the wanted group, said second switch also having wipers and contact banks, the last-mentioned banks having two series of bank contacts, a stepping circuit for the magnet of said second switch controlled by said impulse relay for setting the wipers of said second switch in accordance with a second and a third impulse series, stepping connections for the magnet of said first switch connected to said first series of bank contacts and engaged upon the advancement of the wipers of said second switch responsive to said second impulse series for advancing said first switch from said start position to a position corresponding to a wanted line within said wanted group, means operative at the end of said second impulse series for resetting said second switch so as to place said second series of bank contacts under the control of said second switch, and a plurality of sources of ringing current connected to said second series of bank contacts, one of said sources being selected in accordance with the setting of the wipers of said second switch responsive to said last-mentioned impulse series for selectively signalling the wanted party line.

16. A party line connector as claimed in claim 15, characterized in that said second switch has sets of single-ended wipers, the individual wipers of each set being circumferentially displaced relatively to each other so as to successively engage their respective contact banks, that said first series of bank contacts appears in a contact bank with which one of said wipers cooperates, that said second series of bank contacts appears in another contact bank with which a wiper displaced with respect to the first-mentioned wiper cooperates, and that said second switch has an automatic stepping circuit for the magnet thereof, said circuit being operative at the end of said second impulse series for automatically advancing said switch to a start position for the last-mentioned wiper with respect to said second series of bank contacts.

17. A numerical switch of the single-motion stepping type having a set of wiper means and of associated contact banks, said banks having a plurality of groups of outlets connected thereto and said wiper means in the normal condition of said switch resting in a given position in which they ineffectually engage an outlet of one of said groups, and said switch having associated therewith means responsive to a series of numerical impulses for advancing the wipers of said switch from said given position over positions corresponding to an unwanted group or groups to a start position for the wanted group and means effective incident to such advance for enabling said switch to seize said outlet by way of said wiper means at the time said wiper means re-engage said outlet subsequent to one traverse of said banks by said wiper means.

18. A numerical switch of the single-motion stepping type having a set of multiple-ended wipers and of contact banks, said banks having a plurality of groups of outlets connected thereto, said wiper ends being relatively displaced so as to successively engage the associated bank and one of said ends normally resting ineffectively in a given position to which an outlet of the last of said groups is connected, and said switch having associated therewith means responsive to a series of numerical impulses for advancing the wipers of said switch, concurrently with the receipt of said series, from said normal position over positions corresponding to an unwanted group or groups to a start position for the wanted group, and means effective incident to such advance for preparing seizure of said outlet after another end of said wipers has engaged said outlet in said given position.

19. A numerical switch of the single-motion stepping type having a stepping magnet and a set of multiple-ended wipers and of contact banks, certain of said banks having a plurality of groups of outlets connected thereto, said set also including a control wiper and bank, said wiper ends being relatively displaced so as to successively engage the associated bank and one of said ends normally resting ineffectively in a given position to which an outlet of one of said groups is connected, and said switch having associated therewith an impulse relay responsive to a received series of numerical impulses, an interrupter circuit for said stepping magnet extending over said control wiper, control connections to said control bank including two control conductors, one multipled to the contacts of said control bank in the switch positions corresponding to a predetermined outlet of each of said groups and the other multipled to the contacts of said contact bank in the switch positions corresponding to another predetermined outlet of each group, said impulse relay being responsive to said impulse series for causing said interrupter circuit to be energized alternately over said two control conductors, thereby to advance the wipers of said switch, concurrently with the receipt of said impulse series, over positions corresponding to an unwanted group or groups to a start position for the wanted group, and means effective incident to the advance of said switch for preparing seizure of said outlet after another end of said wipers has engaged said outlet in said given position.

20. A numerical switch of the single-motion stepping type having a set of multiple-ended wipers and contact banks, said banks mounting sets of bank terminals and mounting a set of wiper brush springs in a first predetermined wiper position of said switch and sets of bank terminals in the remaining wiper positions of said switch, said sets of bank terminals having a plurality of groups of outlets connected thereto along said banks, said wiper ends being relatively displaced so as to successively engage the associated bank and one of said ends normally resting ineffectively in a second predetermined wiper position to which an outlet in a group accommodated near the end of said banks is connected, and said switch having associated therewith means responsive to a received series of numerical impulses for advancing the wipers of said switch from said second predetermined wiper position over wiper positions corresponding to outlets of an unwanted group or groups and also over said first predetermined position to a start position for the wanted group, and means effective incident to such advance for preparing seizure of said outlet after being re-engaged by another of said wiper ends upon a complete sweep of said wipers over said banks.

21. A numerical switch of the single-motion stepping type having a stepping magnet, a self-interrupter contact for said magnet and a set of wipers and contact banks, said banks having a plurality of groups of outlets connected thereto and said switch having associated therewith an impulse relay controlled by a received series of numerical impulses, a first stepping circuit for said magnet independent of said self-interrupter contact and controlled by said impulse relay for advancing said switch one step for every impulse received by said relay during a portion of said series to absorb said portion of the series, a second stepping circuit for said magnet including said self-interrupter contact and controlled by said impulse relay for advancing said switch over a plurality of positions corresponding to the outlets of a multi-outlet group for every impulse received by said relay during another portion of said series, and means effective under the control of the switch after it has been advanced a number of steps responsive to the impulses of one of said portions of said series for switching said magnet from one to the other of said stepping circuits.

22. A numerical switch of the single-motion stepping type having a stepping magnet, a self-interrupter contact for said magnet and a set of wipers and contact banks, said banks having a plurality of groups of outlets connected thereto and said switch having associated therewith an impulse relay controlled by a received series of numerical impulses, first stepping connections for said magnet independent of said self-interrupter contact and controlled by said impulse relay during a first portion of said series for advancing said switch over a plurality of positions corresponding to the outlets of a multi-outlet group, one position for every numerical impulse received, second stepping connections for said magnet including said self-interrupter contact and controlled by said impulse relay during a second portion of said series for advancing said switch over a number of positions corresponding to the outlets of one or more other multi-outlet groups, a plurality of positions for every numerical impulse received, and means effective under the control of said switch at the end of said first portion of the series for switching said magnet from said first to said second stepping connection.

23. A numerical switch of the single-motion stepping type having a stepping magnet, a self-interrupter contact for said magnet and a set of wipers and contact banks, said banks having a plurality of groups of outlets connected thereto, and said switch having associated therewith a trunk incoming thereto, an impulse relay controlled by a series of numerical impulses received over said incoming trunk, first stepping connections for said magnet independent of said self-interrupter contact and controlled by said impulse relay during a first portion of said series for advancing said switch over a plurality of positions corresponding to the outlets of a multi-outlet group, one position for every numerical impulse received, second stepping connections for said magnet including said self-interrupter contact and controlled by said impulse relay during a predetermined second portion of said series for advancing said switch over a number of positions corresponding to the outlets of one or more other multi-outlet groups, a plurality of positions for every numerical impulse received, transfer means effective under the control of said switch at the end of said first portion of the series for switching said magnet from said first to said second stepping connections, and means operative at the end of said impulse series if said transfer means fail to become effective due to said series containing a smaller number of impulses than corresponds to said predetermined first portion, for preventing further advancement of said switch and applying a signal to said incoming trunk.

24. A numerical switch of the single-motion stepping type having a stepping magnet, a self-interrupter contact for said magnet, a set of multiple-ended wipers and contact banks, said banks mounting sets of bank terminals and mounting a set of wiper brush springs in one predetermined wiper position of said switch, said sets of bank terminals having a plurality of groups of outlets connected thereto along said banks, and said wiper ends being relatively displaced so as to successively engage the associated bank, and off-normal contacts marking a home position for said switch disposed near the end of said banks and separated from said predetermined wiper position by final positions having outlets of a final one of said groups connected thereto, and said switch having associated therewith an impulse relay controlled by a received series of numerical impulses, first stepping connections for said magnet independent of said self-interrupter contact and controlled by said impulse relay during a first portion of said series for advancing one of said wiper ends over said final positions and also advancing said switch over said predetermined wiper position, one position for every numerical impulse received, second stepping connections for said magnet including said self-interrupter contact and controlled by said impulse relay during a second portion of said series for advancing another of said wiper ends over the wiper positions corresponding to the outlets of one or more other groups to a start position for a wanted one of said plurality of groups including said final group, a plurality of positions for every numerical impulse received, and transfer means effective under the control of said switch upon completion of said first portion of the series for switching said magnet from said first to said second stepping connections.

References Cited in the file of this patent

UNITED STATES PATENTS

| | | |
|---|---|---|
| 2,693,505 | Buchner | Nov. 2, 1954 |
| 2,693,506 | Buchner | Nov. 2, 1954 |